US012614165B2

(12) United States Patent
Joseph et al.

(10) Patent No.: US 12,614,165 B2
(45) Date of Patent: Apr. 28, 2026

(54) BLOCKCHAIN BASED TAX MECHANISM

(71) Applicant: nChain Licensing AG, Zug (CH)

(72) Inventors: Daniel Joseph, Cardiff (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 339 days.

(21) Appl. No.: 18/017,287

(22) PCT Filed: Jun. 29, 2021

(86) PCT No.: PCT/EP2021/067806
§ 371 (c)(1),
(2) Date: Jan. 20, 2023

(87) PCT Pub. No.: WO2022/022928
PCT Pub. Date: Feb. 3, 2022

(65) Prior Publication Data
US 2023/0281591 A1 Sep. 7, 2023

(30) Foreign Application Priority Data
Jul. 30, 2020 (GB) ..................................... 2011858

(51) Int. Cl.
*G06Q 20/20* (2012.01)
(52) U.S. Cl.
CPC ....... *G06Q 20/207* (2013.01); *G06Q 2220/00* (2013.01)
(58) Field of Classification Search
CPC ............. G06Q 20/207; G06Q 2220/00; G06Q 20/0658; G06Q 20/3829; G06Q 20/387;
(Continued)

(56) References Cited

U.S. PATENT DOCUMENTS

2018/0101914 A1* 4/2018 Samuel ............... G06Q 20/401
2019/0130392 A1* 5/2019 Kale .................... H04L 9/0637
(Continued)

FOREIGN PATENT DOCUMENTS

EP 3447715 A1 2/2019
EP 4143723 A1 3/2023
(Continued)

OTHER PUBLICATIONS

PCT/EP2021/067806 International Search Report and Written Opinion dated Sep. 23, 2021, 16 pages.
(Continued)

*Primary Examiner* — Garcia Ade
(74) *Attorney, Agent, or Firm* — Galvani Smith PLLC

(57) ABSTRACT

A computer implemented method of facilitating a consumption tax on a purchase of one or more goods and/or services by a buyer from a seller, wherein at least the buyer is a buyer-seller who makes an onward sale based on said goods and/or services. The method comprises, by the seller of the purchase, obtaining a first blockchain transaction that can be redeemed by a second blockchain transaction meeting either of two alternative conditions: a first condition requiring at least that the second blockchain transaction is signed with a cryptographic signature of the buyer, and a second condition requiring at least that the second blockchain transaction is signed with at least a cryptographic signature of a tax authority; and in response to receiving a payment of the consumption tax from the buyer, sending the first blockchain transaction to be recorded on a blockchain.

17 Claims, 14 Drawing Sheets

(58) Field of Classification Search
CPC ...... G06Q 20/02; G06Q 20/06; G06Q 40/123; G06Q 30/04; H04L 2209/56; H04L 9/3236; H04L 9/3247; H04L 9/50
See application file for complete search history.

(56) References Cited

U.S. PATENT DOCUMENTS

| | | | | |
|---|---|---|---|---|
| 2019/0340703 A1 * | 11/2019 | West | ...................... | H04L 9/0637 |
| 2020/0051056 A1 | 2/2020 | Thevoz | | |

FOREIGN PATENT DOCUMENTS

| | | | | |
|---|---|---|---|---|
| JP | 2019530032 A | 10/2019 | | |
| JP | 2023536396 A | 8/2023 | | |
| WO | 2019004650 A1 | 1/2019 | | |
| WO | 2019119056 | 6/2019 | | |
| WO | WO-2021254703 A1 * | 12/2021 | ........... | G06Q 20/065 |
| WO | 2022002526 A1 | 1/2022 | | |

OTHER PUBLICATIONS

GB2011858.4 Combined Search Report and Abbreviated Exam dated Jan. 8, 2021, 5 pages.

Tenan, Rita, "Could blockchain become government's best ally in driving tax compliance?", Microsoft Industry Blogs, Apr. 16, 2019, 5 pages.

Wikipedia Contributors, "Sales Tax", Wikipedia, the Free Encyclopedia, Jun. 3, 2020, https://en.wikipedia.org/wiki/Sales_tax.

"nLockTime", Nov. 6, 2019, Bitcoin Wiki, https://en.bitcoin.it/wiki/NLockTime.

Wikipedia Contributors, "List of Taxes", Wikipedia, the Free Encyclopedia, May 24, 2022, https://en.wikipedia.org/wiki/List_of_taxes.

Wikipedia Contributors, "Elliptic-curve Diffie-Hellman," Wikipedia, the Free Encyclopedia, https://en.wikipedia.org/w/index.php?title=Elliptic-curve_Diffie%E2%80%93Hellman.

Deloitte, "Blockchain technology and its potential in taxes", Dec. 2017, https://www2.deloitte.com/content/dam/Deloitte/pl/Documents/Reports/pl_Blockchain-technology-and-its-potential-in-taxes-2017-EN.PDF.

Price Water House Coopers, "How blockchain technology could improve the tax system", Dec. 2016, https://www.pwc.co.uk/issues/futuretax/assets/documents/how-blockchain-could-improve-the-tax-system.pdf.

Metcalf, Gilbert E., "Consumption taxation", Encyclopedia of Taxation and Tax Policy (1999).

* cited by examiner

| $TxID_0$ | |
|---|---|
| Input(s) | Output(s) |
| Input<br>• Pointer to previous $Tx$<br>• Index of UTXO in previous $Tx$<br>• Unlocking script for unlocking from previous party<br><br>⋮<br><br>Optional further inputs<br>⋮ | $UTXO_0$<br>• Amount<br>• Locking script locking to Alice<br><br><br>⋮<br><br>Optional further $UTXOs$<br><br>⋮ |

203

| $TxID_1$ | |
|---|---|
| Input(s) | Output(s) |
| Input<br>• Pointer to $Tx_0$<br>• Index of $UTXO_0$ [within $Tx_0$]<br>• Unlocking script for unlocking $UTXO_0$ from Alice<br><br>⋮<br><br>Optional further inputs<br>⋮ | $UTXO_1$<br>• Amount<br>• Locking script locking to Bob<br><br><br>⋮<br><br>Optional further $UTXOs$<br><br>⋮ |

202

Transaction
from Alice to Bob

Validated by running: Alice's
locking script (from output of $Tx_0$),
together with Bob's unlocking
script (as input to $Tx_1$). This checks
that Bob's unlocking script in $Tx_1$
meets the condition(s) defined in
Alice's locking script in $Tx_0$.

$B\_S_0$  
$B\_S_1$  
$B\_S_2$  
$B\_S_n$

Factory presents Retail Certificate

Retailer presents Retail Certificate

Customer pays Sales Tax

Farmer grows cotton

Factory processes

Retailer sells to Customer

Customer buys dress

|  | Sales | Sales Tax Rec'd Charged at 5% where applicable |
|---|---|---|
| Farmer | £1000 | £0 |
| Factory | £3000 | £0 |
| Retailer | £5000 | £250 |
| Customer | N/A | N/A |

| | Sales | VAT 5% Charged on sales | VAT Recovered on Purchases | Net VAT Payable |
|---|---|---|---|---|
| Farmer | £1000 | £50 | £0 | £50 |
| Factory | £3000 | £150 | £50 | £100 |
| Retailer | £5000 | £250 | £150 | £100 |
| | Total VAT paid by Final Customer | | | £250 |

Figure 5

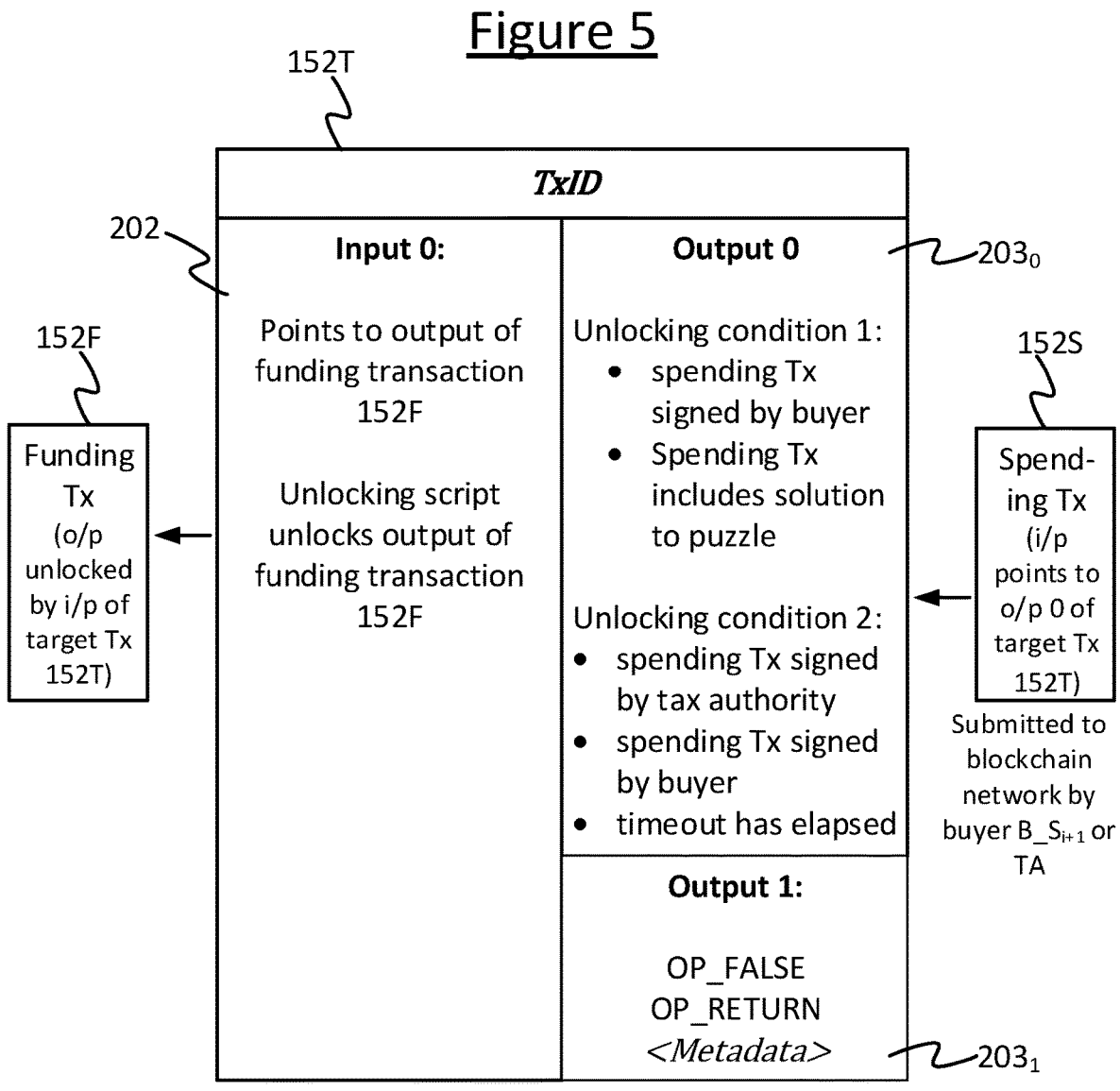

152T

202

152F

203₀

152S

TxID

Input 0:

Points to output of funding transaction 152F

Unlocking script unlocks output of funding transaction 152F

Output 0

Unlocking condition 1:
- spending Tx signed by buyer
- Spending Tx includes solution to puzzle Unlocking condition 2:
- spending Tx signed by tax authority
- spending Tx signed by buyer
- timeout has elapsed

Output 1:

OP_FALSE
OP_RETURN
*<Metadata>*

203₁

Funding Tx (o/p unlocked by i/p of target Tx 152T)

Spend-ing Tx (i/p points to o/p 0 of target Tx 152T)

Submitted to blockchain network by buyer B_S$_{i+1}$ or TA

Submitted to blockchain network 106 by seller B_S$_i$ 152T (VAT)

$VAT_{i+1}$ Transaction

SELLER $(B\_S_i)$

VAT

Tax Authority $\approx 0$

Tax Author-ity

VAT

BUYER $(B\_S_{i+1})$

OP_RETURN

Tags, Sales Transaction meta data $TA, B\_S$ $VAT_{i+1}$ $sv_{i+1}$ AND $sig(P_{i+1})$

OR $sig(TA)$ AND $sig(P_{i+1})$ $VAT_{Ref}$ $B\_S_{i+1}$ $VAT_{Pay}$ $TA$

BLOCKCHAIN BASED TAX MECHANISM

CROSS REFERENCE TO RELATED APPLICATIONS

This application is the U.S. National Stage of International Application No. PCT/EP2021/067806 filed on Jun. 29, 2021, which claims the benefit of United Kingdom Patent Application No. 2011858.4, filed on Jul. 30, 2020, the contents of which are incorporated herein by reference in their entireties.

TECHNICAL FIELD

The present disclosure relates to an application of a blockchain in a tax system.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

One proposed application of blockchain technology is for use in a tax system.

In order to fund government public expenditures, financial charges are generally levied against individuals and legal entities such as businesses inter alia. This taxation may come in many forms including: income tax, property tax, capital gains tax, etc.

A government may implement one or more of these taxation systems based on the government's economic objectives. This is in light of the advantages and disadvantages of each system. As an example, changes in wealth and savings can be more easily accessed via income tax rather than via a consumption tax.

Consumption taxes are taxes such as customs and excise taxes as well as sales tax. These types of taxes are directly tied to the purchase of goods or services.

The role of blockchains in tax collection systems has been previously considered. As an example, https://www.pwc.co.uk/issues/futuretax/assets/docunnents/how-block-chain-could-improve-the-tax-system.pdf describes how the following characteristics of blockchain are applicable to tax.

Transparency—blockchain provides provenance, traceability and transparency of transactions.

Control—access to permissioned networks is restricted to identified users

Security—the digital ledger cannot be altered or tampered with once the data is entered. Fraud is less likely and easier to spot.

Real-time information—when information is updated, it's updated for everyone in the network at the same time.

https://cloudblogs.microsoft.com/industry-blog/government/2019/04/16/could-blockchain-become-governments-best-ally-in-driving-tax-compliance/also refers to the potential for the utilisation of smart contracts in ring-fencing specific tax revenue.

So, for example, a company could automatically record events like transactions, purchases, and salary payments, and pay its tax bill based on what's actually occurred rather than having accountants derive a figure from thousands of records. The reduction in time for both governments and organizations could be substantial. At the same time, non-technical considerations such as legislation need to be addressed before blockchain-oriented tax systems may be implemented.

SUMMARY

Tax per se may be administrative matter, but the systems that implement tax may be subject to tangible problems that can be solved with technology. Particularly, where a buyer is a buyer-seller in a chain—i.e. themselves a business and thus entitled to a refund of a consumption tax such as VAT paid to the seller—then using current systems the buyer typically has to wait until the end of a predetermined period before the consumption tax can be refunded to the buyer. It would be desirable to use technology to provide a mechanism that enables faster refund of the consumption tax to the buyer whilst still retaining (or even improving on) the accountability of existing systems.

According to one aspect disclosed herein, there is provided a computer implemented method of facilitating a consumption tax on a purchase of one or more goods and/or services by a buyer from a seller, wherein at least the buyer is a buyer-seller who makes an onward sale based on said goods and/or services. The method comprises, by the seller of said purchase, obtaining a first blockchain transaction that can be redeemed by a second blockchain transaction meeting either of two alternative conditions: (i) a first condition requiring at least that the second blockchain transaction is signed with a cryptographic signature of the buyer, and (ii) a second condition requiring at least that the second blockchain transaction is signed with at least a cryptographic signature of a tax authority. The method further comprises, in response to receiving a payment of the consumption tax from the buyer, the seller sending the first blockchain transaction to be recorded on a blockchain.

The disclosed technology thus provides an application for blockchain to enable a faster—in embodiments real-time—tax collection system for consumption taxes such as sales tax and VAT. The disclosed systems (examples of which are referred to later as "STAXRT" and "VTAXRT") which facilitate this tax collection and management are designed to enable real-time refund of consumption tax to the buyer—in that a buyer does not have to wait till after a fixed period of time (e.g. 3 months, 12 months) before they are able to get a refund for VAT or sales tax they have previously paid. Their refund should be accessible to them as long as they can prove that they are entitled to the refund.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
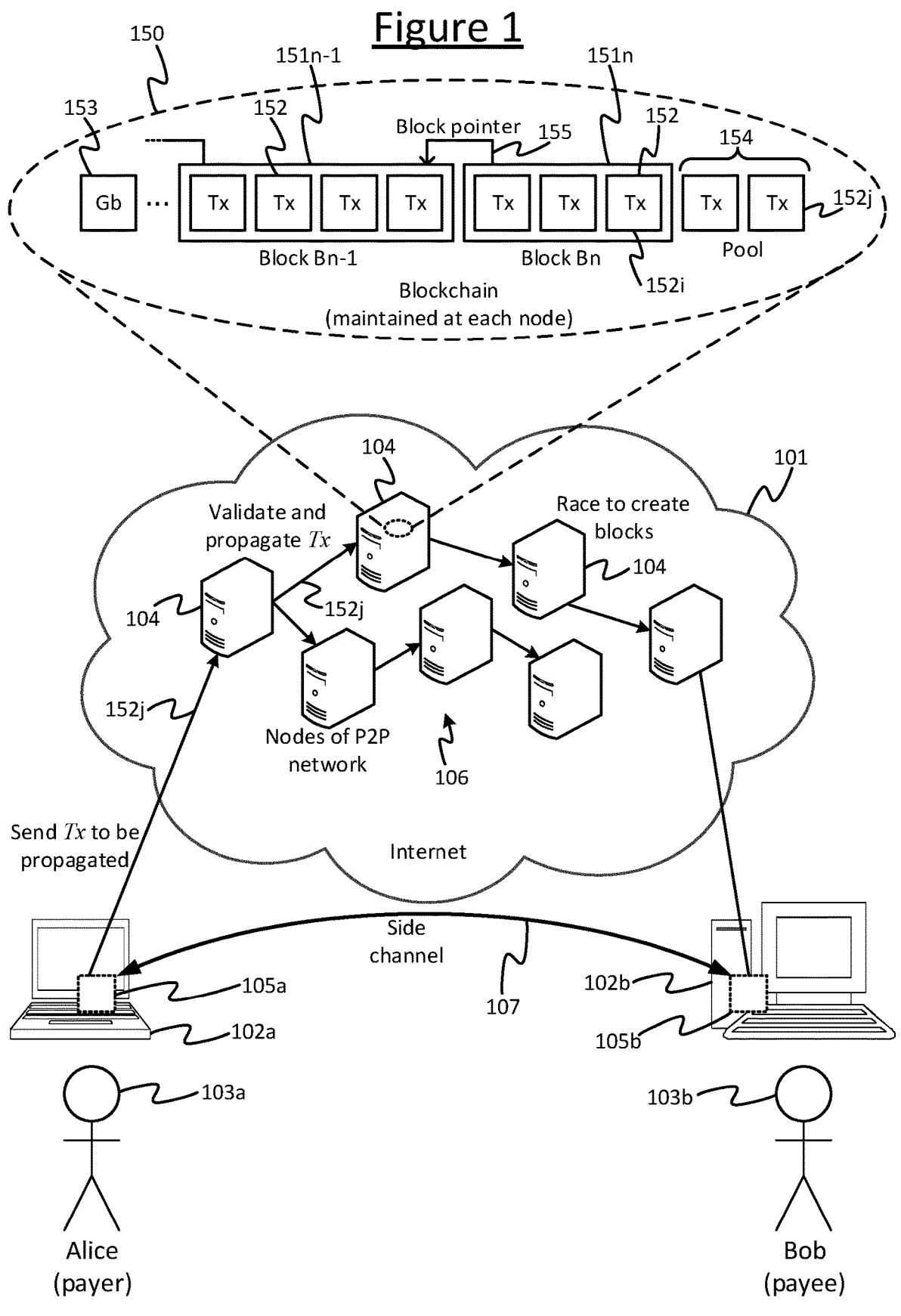
FIG. 1 is a schematic block diagram of a system for implementing a blockchain, FIG. 2 schematically illustrates some examples of transactions which may be recorded in a blockchain, FIG. 3 schematically illustrates operation of a sales tax in an example chain from selling a farmer's cotton to customer's dress, FIG. 4 schematically illustrates operation of a value added tax (VAT) in in an example chain from selling a farmer's cotton to customer's dress, FIG. 5 schematically illustrates an example blockchain transaction for use as part of a mechanism to enable real-time refund to a buyer-seller of a consumption tax such as a sales tax or value added tax, FIG. 6 schematically illustrates another example of VAT payments between participants in a chain of purchases.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151.

The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152$j$, the (or each) input comprises a pointer referencing the output of a preceding transaction 152$i$ in the sequence of transactions, specifying that this output is to be redeemed or "spent" in the present transaction 152$j$. In general, the preceding transaction could be any transaction in the ordered set 154 or any block 151. The preceding transaction 152$i$ need not necessarily exist at the time the present transaction 152$j$ is created or even sent to the network 106, though the preceding transaction 152$i$ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152$i$, 152$j$ be created or sent out-of-order (see discussion below on orphan transactions). The preceding transaction 152$i$ could equally be called the antecedent or predecessor transaction.

The input of the present transaction 152$j$ also comprises the input authorisation, for example the signature of the user 103$a$ to whom the output of the preceding transaction 152$i$ is locked. In turn, the output of the present transaction 152$j$ can be cryptographically locked to a new user or entity 103$b$. The present transaction 152$j$ can thus transfer the amount defined in the input of the preceding transaction 152$i$ to the new user or entity 103$b$ as defined in the output of the present transaction 152$j$. In some cases a transaction 152 may have multiple outputs to split the input amount between multiple users or entities (one of whom could be the original user or entity 103$a$ in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152$j$ (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152$j$ could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152$j$ matches the expected signature, which depends on the previous transaction 152$i$ in an ordered sequence of transactions 152. In such an output-based transaction protocol, this may comprise checking that the cryptographic signature or other authorisation of the party 103 included in the input of the new transaction 152$j$ matches a condition defined in the output of the preceding transaction 152$i$ which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly.

In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152$j$ passes the test for being deemed valid (i.e. on condition that it is "validated"), any blockchain node 104 that receives the transaction 152$j$ will add the new validated transaction 152 to the ordered set of transactions 154 maintained at that blockchain node 104. Further, any blockchain node 104 that receives the transaction 152$j$ will propagate the validated transaction 152 onward to one or more other blockchain nodes 104 in the network 106. Since each blockchain node 104 applies the same protocol, then assuming the transaction 152$j$ is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152$j$). Once the proof-of-work has been done for the pool 154 including the new transaction 152$j$, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103$a$ wishes to create a transaction 152$j$ transferring an amount of the digital asset in question to Bob 103$b$. In FIG. 2 Alice's new transaction 152$j$ is labelled "$Tx_1$". It takes an amount of the digital asset that is locked to Alice in the output 203 of a preceding transaction 152$i$ in the sequence, and transfers at least some of this to Bob. The preceding transaction 152$i$ is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written in the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain"

communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

On-Chain Consumption Tax Mechanism

Consumption taxes are taxes such as customs and excise taxes as well as sales tax. These types of taxes are directly tied to the purchase of goods or services. Of these consumption taxes the following examples focus on the multistage consumption tax system of sales tax and VAT (value added tax). However this is not necessarily limiting on the scope of the applications to which the mechanisms disclosed herein are applicable.

Sales tax refers to a consumption tax that is levied on the sale of a good to its final end user. For jurisdictions where sales tax applies, this tax is paid for every item sold at retail (given that retail-to-customer transaction usually represents the sale to the final end user). For intermediary businesses (e.g. wholesaler-to-retailer) the goods are not charged a tax. In order for these intermediary businesses to avoid paying the sales tax, they need to 'prove that they are an intermediary-type business'. This proof is normally in the form of a "resale certificate" given to them by the applicable tax authority.

The intermediary buyer is required to provide such proof, such as the certificate or its ID number, to a seller at the point of purchase, typically along with a statement that the item is for resale. The tax is otherwise charged on each item sold to purchasers without such a proof assuming the purchaser (who is assumed to be an end consumer).

Figure 3:
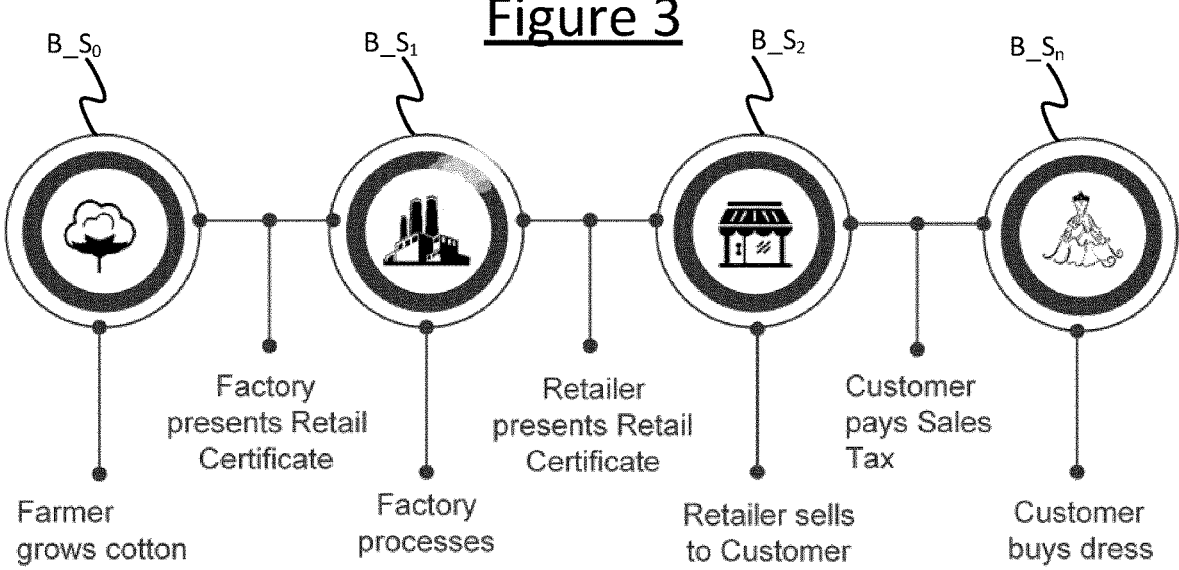

FIG. 3 shows an example of how a sales tax operates in an example chain of purchases from a farmer's cotton to a customer's dress. The table shows the sales tax calculation for some example purchase amounts.

The key characteristic of VAT, on the other hand, is that the participant only pays tax on the value they added to the object. As an example, if the VAT rate is 5% and one buys an item for £100 but sells it for £150, the VAT that the participant owes the tax authority is 5% of £50. Bearing in mind that the value added to the good is £150–£100=£50.

To facilitate this, a buyer-seller is expected to keep track of the VAT that they pay, and the VAT that they receive. They will then include this information in their tax returns when they are filed at the mandated times (annually, quarterly, etc), and the Tax Authority will refund the buyer-seller accordingly.

Figure 4:
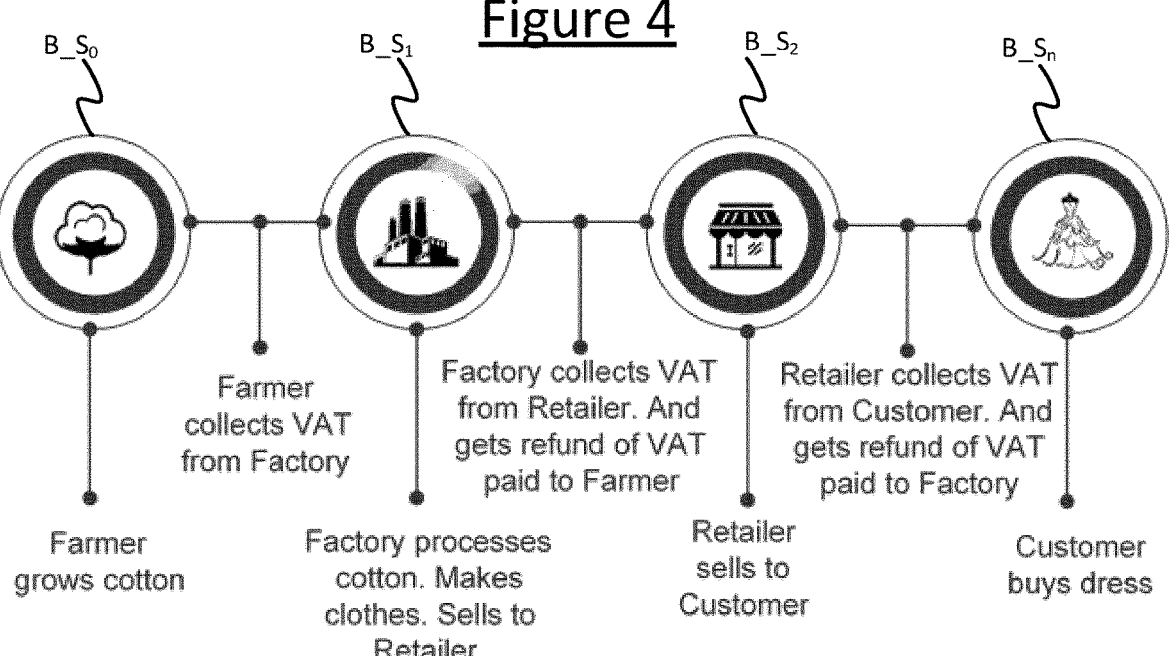

FIG. 4 shows how value is added to goods/services, with the example of cotton being moved through the sales transfer sequence system, ending up as a dress bought by a customer. The table shows the VAT calculation for some example purchase amounts.

Conventionally a buyer-seller such as the farmer, factory or retailer has to wait for a predetermined period such as 3, 6 or 12 months, depending on jurisdiction, before a consumption tax such as VAT that is due to them can be refunded. It would be desirable to find a technological solution that would enable faster refund of consumption taxes. The present disclosure provides a blockchain-based mechanism which enables up to real-time refund of a consumption tax such as VAT. As an alternative or additional advantage, the blockchain based solution can also be used to provide improved accountability and/or security in the collection and/or refund of a consumption tax such as sales tax or VAT.

Figure 6:
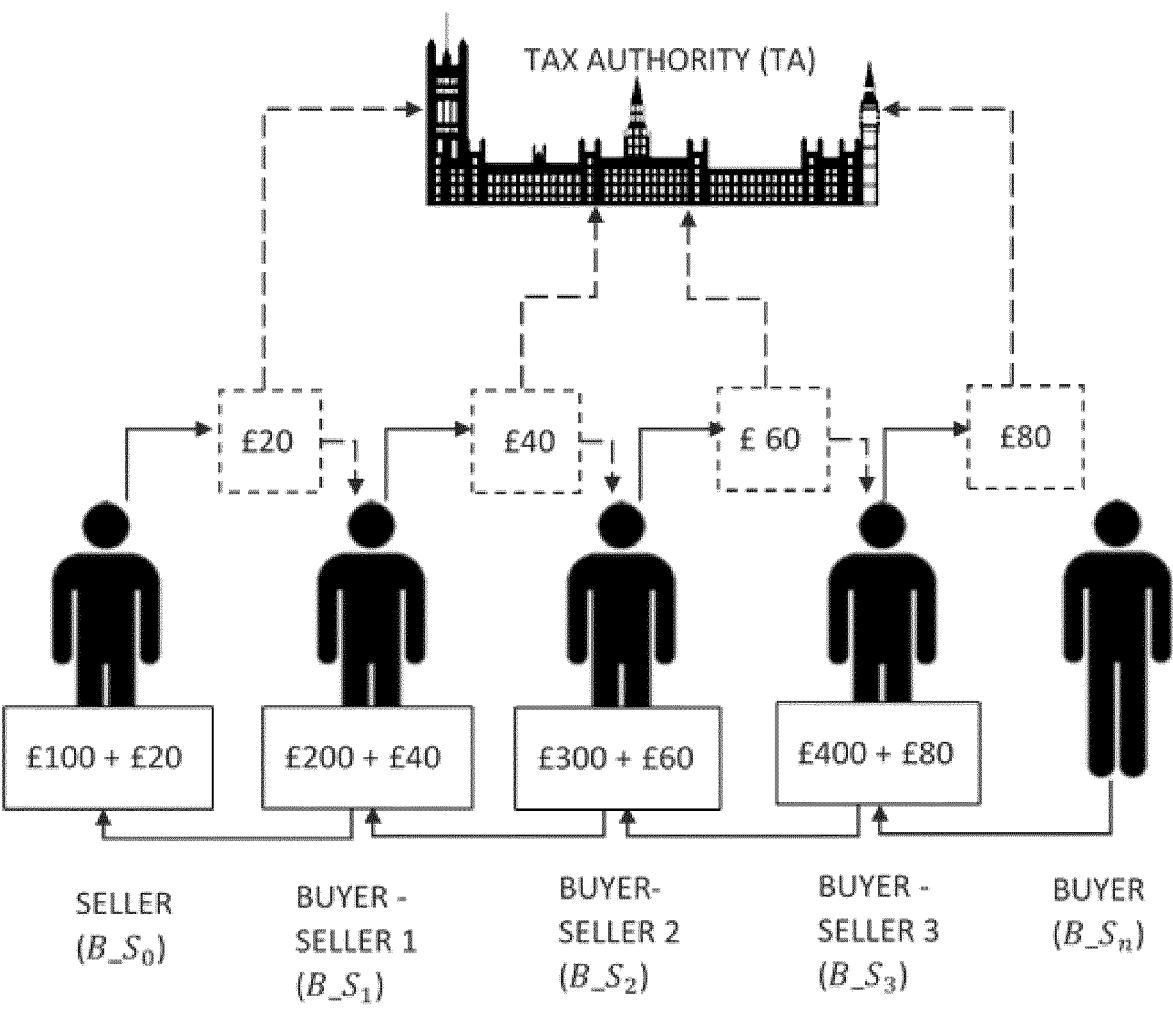

As shown in FIGS. 3, 4 and 6 by way of example, a chain of purchases may include one or more buyer-sellers who are both buyers and sellers of one or more goods and/or services. Each buyer and/or seller in the chain may be labelled herein $B\_S_i$, where $i = 0 \ldots n$. In FIGS. 3 and 4 by way of illustration $n=3$, and in FIG. 6, $i=4$, but it will be appreciated these are just examples. $B\_S_0$ is a seller only, n is the number of buyers, and $B\_S_n$ is a buyer only (end customer). Each of $B\_S_1$ to $B\_S_{n-1}$ is a buyer-seller, i.e. both a buyer and a seller. A buyer-seller $B\_S_{i+1}$ purchases one or more goods and/or services from the preceding seller $B\_S_i$ in the chain, and sells one or more goods and/or services onwards to buyer $B\_S_{i+2}$. As such the buyer-seller either does not have to buy a consumption tax on their purchase (in the case of a sales tax), or is entitled to a refund of the consumption tax (in the case of VAT). Which kind of consumption tax is applied will depend on jurisdiction.

According to the present disclosure, the buyer $B\_S_{i+1}$ pays the consumption tax to the seller $B\_S_i$ (whether a VAT or sales tax) and the seller escrows the consumption tax on chain in a transaction that enables the buyer to claim back the consumption tax assuming they are entitled to do so, but which if not enables the tax authority (TA) to claim the tax. In the case of a VAT this reflects the way VAT works anyway, but enables a faster refund of the VAT to the buyer-seller without having to wait for the end of a predefined accounting period of the tax authority. In the case of a sales tax, then by paying the tax and then getting it refunded immediately, the blockchain can be used to immutably document the fact that the buyer has not paid the sales tax, thus improving security against fraudulent parties avoiding sales tax when not entitled.

FIG. 5 shows an example blockchain transaction 152T that may be used in a blockchain-based mechanism for implementing the above. Merely by way of convenient label, a transaction 152T in such a role may be referred to herein as the "target" transaction, or "first" transaction. In an output-based transaction model, the target transaction 152T comprises at least one input 202 which points to an output of a funding transaction (or "zeroth" transaction) 152F.

The input of the target transaction 152T comprises an unlocking script which unlocks the locking script of the pointed-to output of the funding transaction 152F, thus providing the necessary funds to escrow the consumption tax on chain in the target transaction 152T. The target transaction 152T also comprise at least one output $203_O$, which comprises a locking script specifying conditions for unlocking the escrowed funds. The locking script of this output $203_O$ can be unlocked by an unlocking script in an input of a spending transaction 152S (or "second" transaction) which points to the output $203_O$ of the target transaction 152T, thus enabling a beneficiary of the spending transaction 152S to receive the escrowed funds. According to an output-based implementation of the disclosed mechanism, the locking script of the target transaction 152T is configured with at least two alternative conditions for claiming the funds: a first condition which at least requires the spending transaction 152S to be signed by the buyer $B\_S_{i+1}$; and a second, alternative condition which at least requires the spending transaction 152S to be signed by the tax authority TA. Thus either the buyer or tax authority can potentially claim the funds. This enables the buyer $B\_S_{i+1}$ to reclaim the consumption tax to which they are entitled a refund, but if they do not reclaim it, then the tax authority TA can claim the funds instead.

In an output based model, the spending transaction 152S is signed by including a cryptographic signature of the relevant party (in this case either the buyer $B\_S_{i+1}$ or tax authority TA) in the unlocking script in the input of the spending transaction 152S. The signature is generated by using a cryptographic signing function to apply a private key of the party (buyer or TA) to at least a portion of the spending transaction, and this signature is included in the unlocking script. The signature can be authenticated using a corresponding public key of the party in question, and this principle enables a challenge for the signature to be included in the locking script of the target transaction 152T. Details of public-private key pairs and cryptographic signing techniques will, in themselves, be familiar to a person skilled in the art.

In embodiments, the first condition may require one or more extra requirements to be met to enable the buyer $B\_S_{i+1}$ to reclaim the funds. In embodiments, this comprises a requirement that the unlocking script of the spending transaction 152S includes a solution to a puzzle, where this solution comprises a secret value that was earlier provided to the buyer $B\_S_{i+1}$ by the tax authority TA in response to verifying that the buyer is entitled to a refund. For example this may comprise verifying information about the purchase, and/or verifying an identity of the buyer (such as by authenticating a digital certificate of the buyer certifying them as an approved buyer-seller). In embodiments the puzzle may comprise a hash puzzle. In other words the puzzle comprises a hash of a preimage, wherein the preimage comprised at least the secret value (and in some cases one or more additional elements concatenated with the secret). The buyer $B\_S_{i+1}$ must then present the correct preimage to unlock the output $203_O$ of the target transaction 152T and thus claim the funds. To implement this requirement, the locking script of the target transaction 152T includes the hash and a piece of locking script which challenges the unlocking script to include the solution (in this example the preimage). Note however that the puzzle is not limited to being a hash puzzle in all possible embodiments. Other possible cryptographic puzzles are also known in the art, e.g. an r-puzzle.

In some embodiments, the first condition (enabling the buyer $B\_S_{i+1}$ reclaim the funds) comprises a requirement which changes for each individual purchase, for example by generating a new secret per purchase (e.g. randomly or based on information about the purchase such as a purchase order). This means the buyer has to obtain approval for each individual refund. E.g. such a system could be applied in the case of a value added tax (VAT). Alternatively however the first condition may not require an individual solution to be provided per purchase, and may remain static over a plurality of purchase. For example the first condition may only require the buyer $B\_S_{i+1}$ to prove their identity by means of the cryptographic signature, or may also require them to provide a solution comprising a secret that is provided to the buyer by the TA once when the buyer first registers as a buyer-seller. E.g. such a system could be applied in the case of a sales tax.

In embodiments, the second, alternative condition may require one or more extra requirements to be met in order to enable the tax authority TA to reclaim the funds instead of the buyer $B\_S_{i+1}$. In embodiments, this may comprise a requirement that the spending transaction 152S is signed with a signature of the buyer $B\_S_{i+1}$ as well as the tax authority TA. In this case the TA can only reclaim the funds with approval from the buyer. If the buyer does not do this but the TA thinks the buyer owes them tax, then the TA can always revert to legal means.

As another, alternative or additional example of an extra requirement required by the second condition, the locking script of the funding transaction may require a time-out period have elapsed before the tax authority TA can claim the funds. I.e. the current time must be later than the time-out time specified in the locking script. As will be familiar to a person skilled in blockchain, time for such purposes can be measured either in human time (seconds, minutes, hours, days, weeks, months and/or years), or in terms of block height (the number of blocks that have successfully had a proof-of-work solution published over the network 106 and thus been included in the blockchain 150). Thus the tax authority TA can only claim the funds if the buyer $B\_S_{i+1}$ does not reclaim them for a certain period.

Optionally the target transaction may also include an additional, unspendable output 203$_1$ used to store metadata of the purchase. E.g. using the Script language, the additional output 203$_1$ may be made unspendable by inclusion of an OP_RETURN opcode, or OP_FALSE followed by OP_RETURN, depending on the protocol applied by the blockchain network 106. The metadata may for example include a copy or hash of the purchase order, invoice, date of purchase, shop ID, customer ID, invoice ID, and/or any other information related to the purchase or parties involved. Once the target transaction 152T is included in a block 151, then this metadata will then stay on chain as an immutable record, e.g. for auditing purposes.

It will be appreciated that similar functionality to any of the above could alternatively be provided using smart contracts in an account-based model rather than an output-based model.

Whatever type of transaction model is used, the method may proceed as follows. Communications between the buyer $B\_S_{i+1}$, seller $B\_S_i$ and tax authority TA may be conducted between respective computer equipment 102 of the parties via any suitable off-chain side channel 107.

A. The buyer $B\_S_{i+1}$ sends a purchase order to the seller $B\_S_i$. The purchase order specifies the one or more goods and/or services being ordered. The buyer $B\_S_{i+1}$ may also send a digital certificate (or a reference thereto) certifying the identity of the buyer $B\_S_{i+1}$ to the seller $B\_S_i$.

B. The seller $B\_S_i$ generates an invoice and sends a request message to the tax authority TA. The request message may include the invoice, which specifies the one or more goods and/or services being sold. The request message may alternatively or additionally include the certificate of the buyer $B\_S_{i+1}$, and/or a digital certificate of the seller $B\_S_i$ to certify the identity of the seller. In embodiments the seller $B\_S_i$ may only send the request message if the seller $B\_S_i$ authenticates the certificate of the buyer.

C. In response to the request message the TA verifies whether a refund of the sales tax is approved, e.g. by verifying details of the purchase, and/or authenticating the certificate of the buyer and/or seller. This step may comprise verifying that the buyer $B\_S_{i+1}$ is a buyer-seller and not an end-consumer. If the verification is passed, the TA sends a confirmation message back to the seller $B\_S_i$. In embodiments the confirmation message may include the puzzle (e.g. hash puzzle) to be included in the target transaction 152T. Or in some cases the confirmation message may comprise a template version of the target transaction 152T. In embodiments the confirmation message may include a certificate of the TA certifying the identity of the TA.

D. The seller $B\_S_i$ forwards a confirmation back to the buyer $B\_S_{i+1}$. This may include some or all of the information from the confirmation message from TA, e.g. the certificate of the TA.

E. The buyer $B\_S_{i+1}$ pays the consumption tax to the seller $B\_S_i$. This could be done on chain via another blockchain transaction 152 (not shown), or using fiat currency.

F. The seller $B\_S_i$ obtains the target transaction 152T. To do this, the target transaction 152T may be generated by the seller $B\_S_i$ themselves. Alternatively, a template of the target transaction 152T may be received in the confirmation message from the TA, to be completed by the seller $B\_S_i$, e.g. by adding their signature to the input 202. Or more generally the template could be received from any party, such as the buyer $B\_S_{i+1}$ or a fourth party.

G. The seller $B\_S_i$ transmits the target transaction 152T to the blockchain network 106 to be published in a block 151 on the blockchain 150. This step could comprise the seller $B\_S_i$ sending the target transaction 152T directly to a node 104 of the blockchain network 106 themselves, or instead sending it vicariously via one or more intermediate parties between the seller $B\_S_i$ and a node 104. In some embodiments step F may be performed only if the seller $B\_S_i$ authenticates the certificate of the tax authority.

H. If a secret is required from the TA (because the puzzle was included in the target transaction 152T), the buyer $B\_S_{i+1}$ sends a request message to the TA, and in response receives back the required secret. This step could be done in response to completion of the purchase between buyer $B\_S_{i+1}$ and seller $B\_S_i$, or at the time of an onward sale by the buyer $B\_S_{i+1}$ to another buyer $B\_S_{i+2}$, or at an earlier time before the first purchase when the buyer $B\_S_{i+1}$ registers with the TA as a buyer-seller. This will depend on whether a new secret is required per purchase or just once at the time of a once-time registration, or indeed whether the secret is required at all (in other embodiments the signature of the buyer $B\_S_{i+1}$ may be deemed sufficient to prove the identity of the buyer as a buyer-seller for the purpose of reclaiming the funds escrowed in the target transaction 152T). In some embodiments step G may be performed only if the buyer $B\_S_{i+1}$ authenticates the certificate of the TA.

I. The buyer $B\_S_{i+1}$ obtains a spending 152S for redeeming the output 203₀ of the target transaction. This step could comprise the buyer $B\_S_{i+1}$ generating it themselves, or the buyer receiving a template of the spending transaction 152S from another party for the buyer to complete, such as by adding their signature (and the secret if required) to the unlocking script. In the case of a template being received, the template could be received from the buyer $B\_S_i$, tax authority TA or a fourth party.

J. The buyer $B\_S_{i+1}$ transmits the spending transaction 152T to the blockchain network 106 to be published in a block 151 on the blockchain 150. This step could comprise the buyer $B\_S_{i+1}$ sending the spending transaction 152S directly to a node 104 of the blockchain network 106 themselves, or sending it vicariously via one or more intermediate parties between the buyer $B\_S_{i+1}$ and a node 104. In some embodiments step I may be performed only if the buyer $B\_S_{i+1}$ authenticates the certificate of the tax authority.

Steps A to D and H are optional, but may be employed to improve communication between parties and/or to improve the security of the process. For instance the presentation and authentication of the certificates in steps A-C improves security against fraudulent or malicious parties subverting the system. Note also that except where there is a logical dependency, not all of the steps above have to be performed in the order presented. E.g. steps E and F could be performed in either order with respect to one another.

By way of illustration, the implementation of some example systems will now be discussed in more detail in the context of a value added tax (VAT) and a sales tax. The example systems may be referred to herein as Tax In Real Time (TAXRT) systems.

Tax In Real Time (TAXRT) is, as the name suggests, a taxation system built on the real time processing of taxes. More specifically, this is a blockchain-based system for managing the processes surrounding multi-stage consumption tax systems such as sales tax and value-added-tax (VAT).

The following outlines the sales tax (STAXRT) and VAT (VTAXRT) versions of the real-time systems. Each is built around a system of customised blockchain transactions and a protocol for interaction between the stakeholders (and/or other participants) in the system.

Value Added Tax System—VTAXRT

The VTAXRT is the version of the system that is designed to facilitate the unique characteristics of Value Added Tax systems. Recall that the key element of VAT is that the 'participant in the sequence of buying and selling of an item' is only expected to pay taxes on the value that they have added to that item—as such, on selling the item, the participant is expected to be refunded the tax they paid from their previous purchase of the item. The participants in the system may be described as follows.

TABLE 1 participants in the system.

| Entity | Symbol | Description |
|--------|--------|-------------|
| Buyer and/or seller | $B\_S_i$ | A buyer-seller is an entity who purchases as well as sells the item in question. Person somewhere in the middle of the sequence. e.g. wholesaler. $B\_S_n$ is the entity who ONLY PURCHASES the item in question. This is the last person in the sequence, e.g. customer at a retail grocer. |

TABLE 1-continued participants in the system.

| Entity | Symbol | Description |
|--------|--------|-------------|
| | | $B\_S_0$ is the entity who ONLY SELLS the item in question. This is the first person in the sequence, e.g. farmer. |
| Tax Authority | TA | The Tax Authority is the body responsible for collecting taxes and handling refunds. e.g. Government, IRS, HRMC. |

Payments

The design of the system is first described with respect to the payments between participants, as captured by way of example in FIG. 6. Note that the system is designed on the premise that it is the seller that is responsible for collecting the VAT and paying the VAT to the tax authority TA.

The left-most party is the seller ($B\_S_0$). As previously mentioned, we assume that this participant only sells goods. The buyer $B\_S_1$ purchases the item (Item1) from $B\_S_0$. It is of course possible that the more than one item is being purchased, but for explanatory purposes, we refer to only one 'item' being bought or sold. In the example shown the VAT rate is set at 20%. As such if Sale Price is £100, then the $B\_S_1$ should pay £20 in VAT to $B\_S_0$. This payment could be on block (cryptocurrency) or off block (e.g. FIAT). This, and similar types of payments (Sale Price+VAT), are shown as the arrows at the bottom of figure.

On receipt of the VAT from $B\_S_1$ the seller $B\_S_0$ then creates a blockchain transaction (e.g. Bitcoin transaction) that escrows the VAT in such a way that it can only be claimed by either the Tax Authority or $B\_S_1$ (a UTXO locked to TA or $B\_S_1$ as two alternative conditions). Each potential recipient of said transaction has conditions under which they are able to claim the VAT. For the Tax Authority, the funds can be claimed only after a specified time $t_1$. This time is set in a joint agreement between the seller $B\_S_0$ and the Tax Authority. This is likely to be based on a standard time stipulated in the jurisdiction's tax code.

The claim of the escrowed funds by $B\_S_1$ represents the VAT refund to $B\_S_1$. The expectation is that the refund is given to $B\_S_1$ when $B\_S_1$ sells on the item to a buyer $B\_S_2$. When $B\_S_1$ sells the item, or at least agrees to sell the item to $B\_S_2$, seller $B\_S_1$ will communicate this to the Tax Authority. Assuming the Authority's approval, the Authority will securely communicate to $B\_S_1$ a secret value $sv_1$. Knowledge of this secret value is what would allow $B\_S_1$ to then claim their VAT refund from the escrow. A hash of this secret is also communicated to the seller $B\_S_0$ to enable them to create the transaction locking the funds to the secret. Given that the Tax Authority is equally able to access these funds (albeit after a point in time $t_1$) then $B\_S_1$ would be wise to claim the funds after receiving the secret value, before the Tax Authority is able to spend. Allowing the TA to claim the funds is a provision to allow for the eventuality that $B\_S_1$ doesn't in fact turn out to be a buyer-seller (or cannot prove it).

This series of steps is repeated between each of the participants that follow in the sequence. Consider a generic pair of buyer-sellers $B\_S_i$ and $B\_S_{i+1}$. Note that Item$_{i+1}$ is the next iteration of Item$_i$ (e.g. cloth to dress). The list of Payments between $B\_S_i$, $B\_S_{i+1}$, and Tax Authority is as follows.

The buyer $B\_S_{i+1}$ purchases the item (Item$_{i+1}$) from $B\_S_i$. The VAT rate is set at r where r is a ratio. As such, if Sale Price is $£X_{i+1}$, then buyer $B\_S_{i+1}$ should pay $£rX_{i+1}$ in VAT to $B\_S_i$. This payment could be on block (cryptocurrency) or off block (e.g. FIAT).

On receipt of the VAT from $B\_S_{i+1}$ the seller $B\_S_i$ then creates a Bitcoin transaction that escrows the VAT in such a way that it can only be claimed by either the Tax Authority or $B\_S_{i+1}$. Each potential recipient of said transaction has conditions under which they are able to claim the VAT. For the Tax Authority, the funds can be claimed only after a specified time $t_{i+1}$. This time is set in a joint agreement between the seller $B\_S_i$ and the Tax Authority. This is likely to be based on a standard time stipulated in the jurisdiction's tax code.

The claim of the escrowed funds by $B\_S_{i+1}$ represents the VAT refund to $B\_S_{i+1}$. The expectation is that the refund is given to $B\_S_{i+1}$ when $B\_S_{i+1}$ sells on the item to a buyer $B\_S_{1+2}$ (or seller SL). When $B\_S_{i+1}$ sells the item, or at least agrees to sell the item to $B\_S_{i+2}$, buyer-seller $B\_S_{i+1}$ will communicate this to the Tax Authority. Assuming the Authority's approval, the Authority will securely communicate to $B\_S_{i+1}$ a secret value $sv_{i+1}$. Knowledge of this secret value is what would allow $B\_S_{i+1}$ to then be able to claim their VAT refund from the escrow. Given that the Tax Authority is equally able to access these funds (albeit after a point in time $t_{i+1}$) then $B\_S_{i+1}$ would be wise to claim the funds after receiving the secret value, before the Tax Authority is able to spend. The secret should be unpredictable to the buyer, e.g. by being generated randomly by the tax authority, or being an unpredictable function of a per-purchase value such as the purchase order (e.g. concatenate the purchase order with some other value known to the tax authority and then hash).

Protocol

In order to facilitate this set of payments between the participants, the participants may perform several actions. These actions are captured in the protocol outlined in FIG. 7.

In the protocol shown in the figure, it is first assumed that each buyer and/or seller ($B\_S_i$) has at least one public key that they utilise for signing VAT transactions and for Diffie Heiman secure communication (Diffie Hellman is a is a method of securely exchanging cryptographic keys over a public channel). While these keys could all be different (for each transaction or otherwise), for simplification purposes all these public keys for that buyer-seller are given the label $P_i$. While it may not be absolutely mandatory, it is assumed that the public key $P_i$ is certified with some central authority—perhaps the Tax Authority itself.

Figure 7:
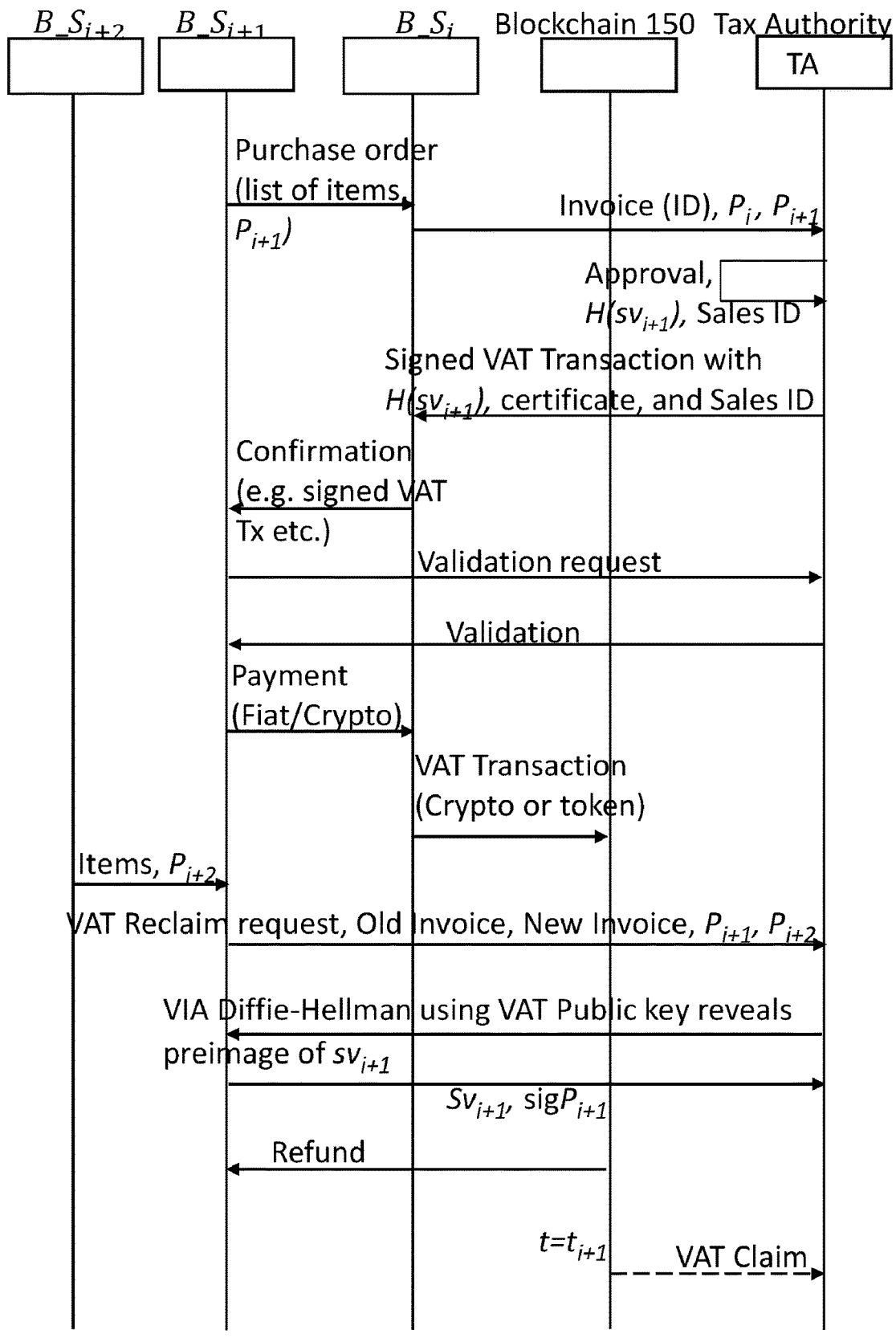
FIG. 7 is a signalling chart showing actions of participants in an example protocol for reclaiming VAT payments.

As per FIG. 7, the first thing that happens is the buyer $B\_S_{i+1}$ gives $B\_S_i$ the purchase order that contains the item $Item_{i+1}$ being bought. Along with purchase order, $B\_S_{i+1}$ also provides his/her public key $P_{i+1}$. Using this information, the seller $B\_S_i$ creates an invoice and sends the invoice to the Tax Authority along with the buyer and seller's public key and their corresponding digital certificates.

The Tax Authority does its due diligence on the information including assessing the credibility of certificates as well as determining whether the item $Item_{i+1}$ is an iteration of a previous item. Assuming its approval, the Authority creates a random number $sv_{i+1}$ and calculates $H(sv_{i+1})$ where $H()$ is a deterministic hash function. This sales transaction ($ST_{i+1}$) is an overall description of the sale (not a blockchain transaction). It is given a Sales ID by the Authority, and this is communicated back to the seller $B\_S_i$, along with $H(sv_{i+1})$, a signed copy of the Invoice, and applicable certificate information and public key $P_{TA}$. If the item $Item_{i+1}$ is an iteration of a previous item (e.g. $Item_i$) then the Authority initiates a secret share scheme such as Diffie Heiman to securely communicate the value $sv_i$ to the buyer-seller $B\_S_i$ (this is for $B\_S_i$ to collect their tax refund for an earlier sale of $Item_i$).

With the exclusion of the secret value $sv_i$, then for information purposes, the seller $B\_S_i$ forwards the signed copy of the Invoice, the value $H(sv_{i+1})$ as well as the digital certificates to the buyer $B\_S_{i+1}$. The buyer $B\_S_{i+1}$ may then validate the certificates with the Tax Authority if he desires. If the buyer $B\_S_{i+1}$ receives the validation, then he/she may then proceed to pay the VAT (and cost of good/service) required for the good to the seller $B\_S_i$.

On payment of the VAT (in crypto or otherwise) to the $B\_S_i$, the seller $B\_S_i$ then constructs a VAT Bitcoin transaction ($VAT_{i+1}$) to be submitted to the blockchain. A core attribute of this Bitcoin transaction is that it needs to serve as an escrow of the VAT. The transaction, we recall, is to enforce the rules that:

The Tax Authority can access the output of $VAT_{i+1}$ after a specified point in time.

The buyer-seller $B\_S_{i+1}$ can access the output of $VAT_{i+1}$ (as a VAT refund) if $B\_S_{i+1}$ is able to produce the secret value $sv_{i+1}$.

This is enforced through the customised output script in $VAT_{i+1}$ as well as a protocol governing the signing of the spending transactions (see later).

After $VAT_{i+1}$ is submitted to the blockchain, consider the scenario where a new buyer-seller $B\_S_{i+2}$ wants to purchase $Item_{i+2}$ from $B\_S_{i+1}$. This is where $Item_{i+2}$ is the next iteration of $Item_{i+1}$ (e.g. cloth to dress).

When the current buyer $B\_S_{i+2}$ submits his/her purchase order to the seller $B\_S_{i+1}$, when submitting the details of the sales transaction to the Tax Authority, the current seller $B\_S_{i+2}$ also includes a VAT Refund Request in this dataset. This Refund Request will include various existing documentation of $B\_S_{i+1}$'s previous purchase of $Item_{i+1}$, including references to: sales transaction ($ST_{i+1}$) and VAT Transaction ($VAT_{i+1}$).

On receiving and validating the VAT Refund request, (along with processing sales transaction) the Tax Authority will initiate a Diffie-Hellman process with $B\_S_{i+1}$ through which the secret value $sv_{i+1}$ is passed on to $B\_S_{i+1}$. Note that the Diffie Hellman process is carried out using the certified public keys of the Tax Authority and the buyer-seller $B\_S_{i+1}$. The buyer-seller $B\_S_{i+1}$ is then able to spend the output of VAT transaction ($VAT_{i+1}$) using the value $sv_{i+1}$ (as well as his/her signature $sig(P_{i+1})$).

If $B\_S_{i+1}$ does not claim the output of $VAT_{i+1}$ before a time $t_{i+1}$ then the Tax Authority can spend the output (essentially, the Government at this point claims the funds).

VAT Transactions

Figure 8:
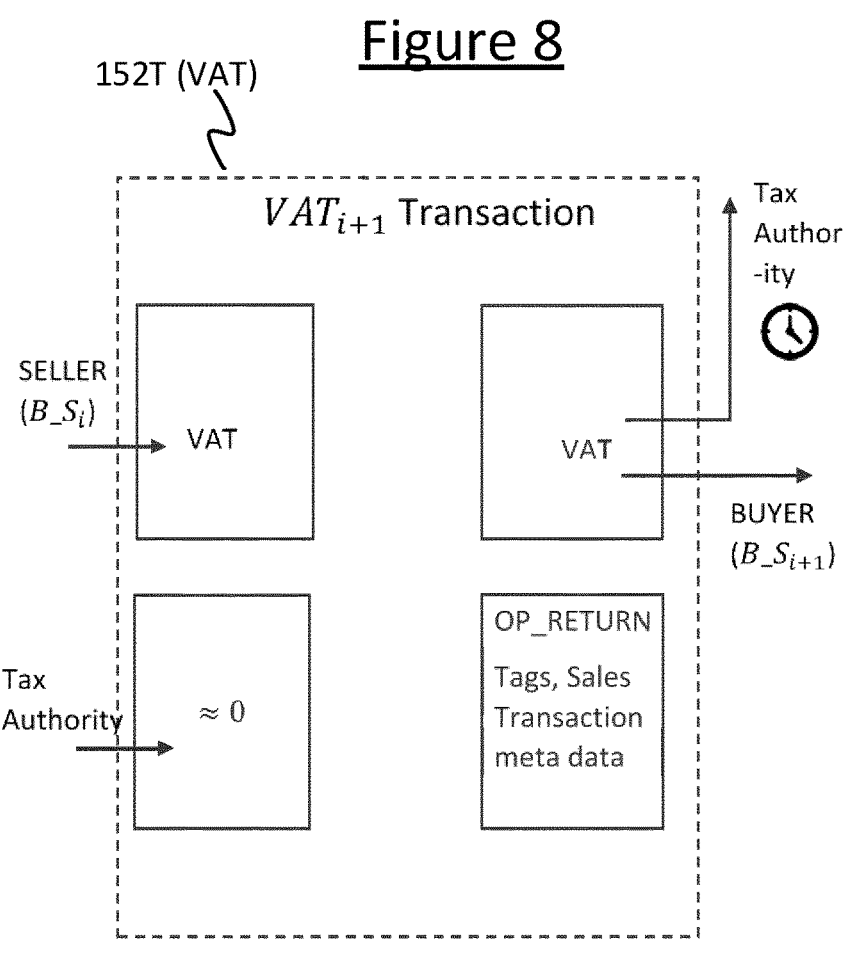
FIG. 8 is a schematic visual representation of a VAT transaction showing inputs and outputs, FIG. 9 schematically illustrates a commitment channel for the escrow of VAT.

The VAT transaction, $VAT_{i+1}$, as previously described, is a transaction that escrows the VAT paid in relation to a sales transaction $ST_{i+1}$. A visual representation of the VAT transaction is shown in FIG. 8. Here the inputs and the outputs are shown along with the associated contributors and (potential) recipients. The seller $B\_S_i$ provides the funds for the input; the Tax Authority provides their signature as approval (via contributing an input with a nominal/minimal fee); whereas the VAT output can be received by either the Tax Authority or the buyer $B\_S_{i+1}$.

One notices (in addition to the VAT output) the presence of another output. This is the OP_RETURN output and is included as a secondary output for the storing metadata related to the sales transaction (e.g. a copy or hash of the invoice, date of transaction, shop ID, customer ID, invoice ID, or any info related to the purchase). This meta data may be encrypted for the purposes of privacy if desired. An OP_RETURN output in a Bitcoin transaction is an unspendable output. Unless specified otherwise, referral to the 'output' of the VAT transaction is referring to the VAT output of the transaction, not the OP_RETURN output.

The success of the required escrow properties of the VAT transaction depends on a combination of the script and the signing protocol of the VAT and its spending transactions. The spending transactions are the transactions that spend the output of the VAT transaction.

Figure 9:
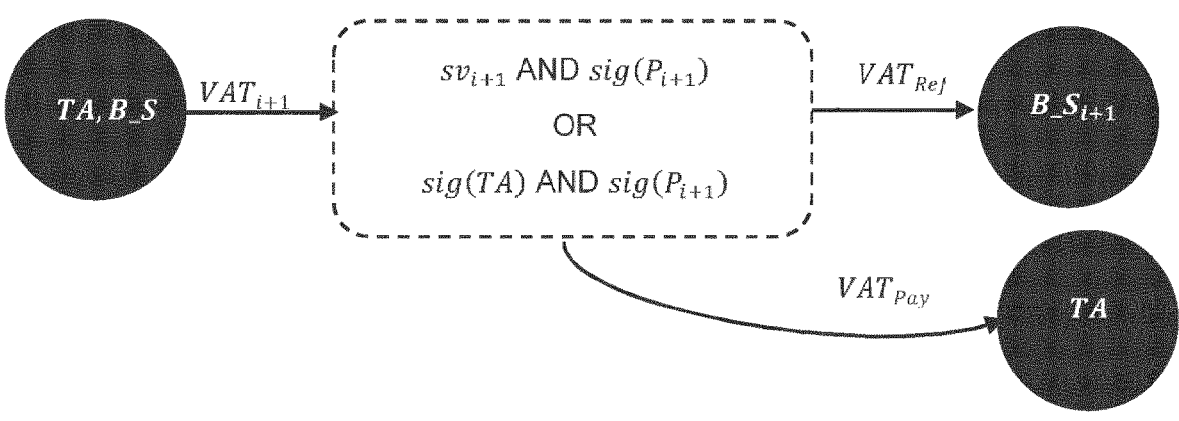

This is achieved through the use of a commitment channel as shown in FIG. 9.

The commitment channel is made up of three transactions.

$VAT_{i+1}$: This is the transaction that commits the VAT to the escrow.

$VAT_{pay}$: This is the spending transaction that pays the VAT to the government.

$VAT_{Ref}$: This is the spending transaction that refunds the VAT to the buyer-seller $B\_S_{i+1}$.

Figure 10:
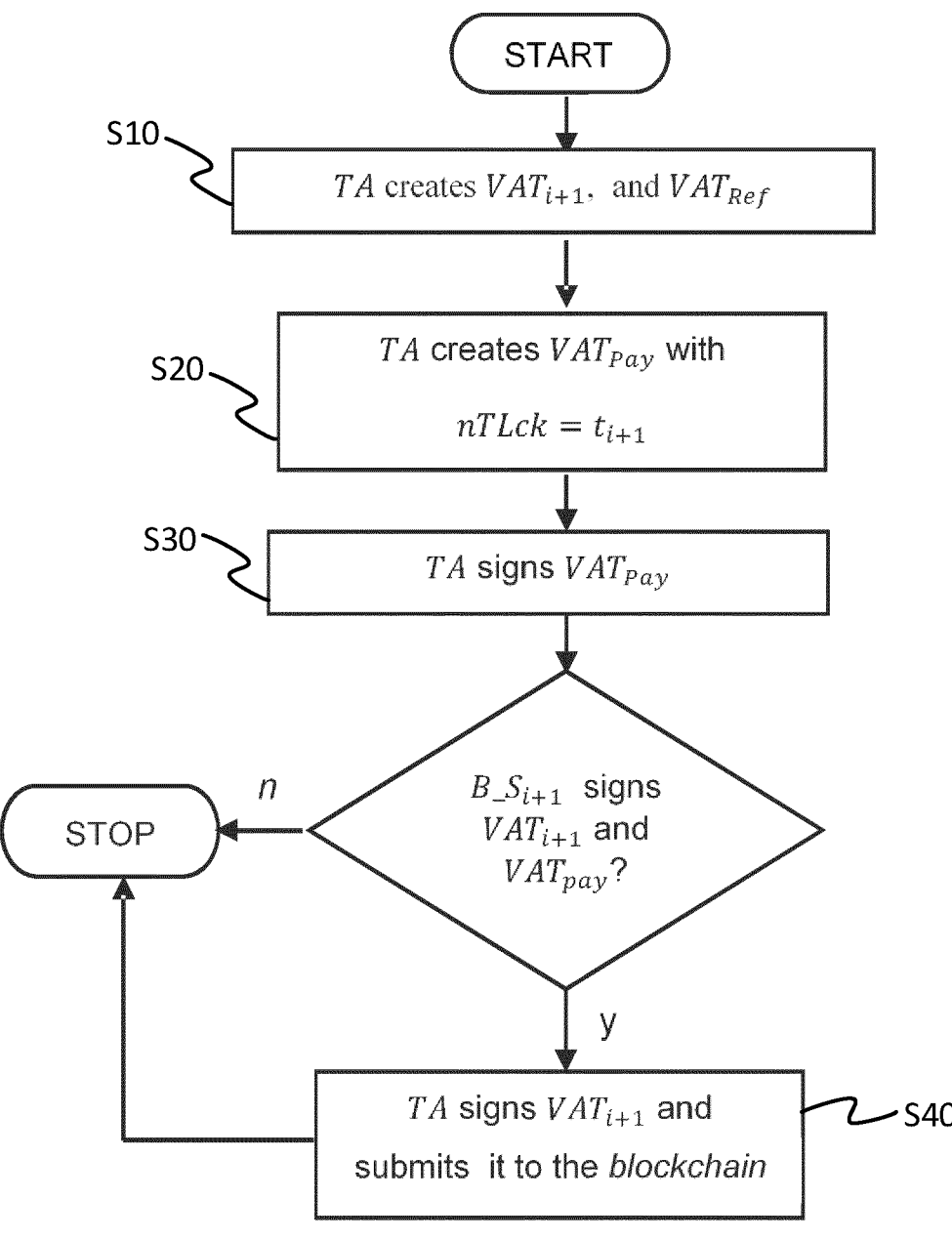
FIG. 10 is a flowchart for a commitment channel for VAT.

Details of each transaction are described below alongside the flow chart of FIG. 10 for the construction of the channel.

S10: The initial commitment transaction $VAT_{i+1}$ (Table 2) makes available $rX_{i+1}$ (in its cryptocurrency equivalent) that can only be spent, as per its <scriptPubKey>, by either:

'the signatures of both $P_{i+1}$ and $P_{TA}$

OR

'$sv_{i+1}$ AND signature of $P_{i+1}$'

S20: The payment transaction, $VAT_{pay}$, (Table 3), of the commitment channel contains an nLockTime value that is chosen to allow for a legislated or otherwise time period to happen, before the Tax Authority is able to collect the VAT. Within this time period it is expected that the buyer-seller $B\_S_{i+1}$ would have had enough time perform the item iteration $Item_{i+1} \rightarrow Item_{i+2}$ and have $Item_{i+2}$ sold. nLockTime is a Bitcoin transaction parameter that allows a Bitcoin transaction to only be executable after a specified time has passed.

S30: The payment transaction, $VAT_{pay}$, must be signed by both the buyer-seller $B\_S_{i+1}$ and the Tax Authority TA. This is done to ensure that the TA cannot renege on their 'promise' to only collect the VAT after time $t_{i+1}$. The inclusion $B\_S_{i+1}$ as part of the process gives $B\_S_{i+1}$ the ability to ensure that the nLockTime value is set to the correct value by the TA. And visa versa.

S40: The <scriptSig> of the refund transaction, $VAT_{Ref}$, is expected to contain within it the secret value $sv_{i+1}$. An example of such a $T_{Ref}$ transaction is shown in Table 4.

Examples of each transaction type are shown in Table 2, Table 3 and Table 4 below.

TABLE 2

| VAT Commit Transaction $VAT_{i+1}$ Transaction | | |
|---|---|---|
| nLockTime | | — |
| Number of Inputs | | 2 |
| Input 0 | Value | $rX_{i+1}$ |
| | Unlocking Script | $P_{i+1}$ sig($P_{i+1}$) |
| Input 1 | Value | ≈0 |
| | Unlocking Script | $P_{TA}$ sig($P_{TA}$) |
| Number of Outputs | | 2 |
| Output 0 | Value | $rX_{i+1}$ |
| | Locking Script | OP_IF OP_2 $P_{i+1}$ $P_{TA}$ OP_2 OP_CHECKMULTSIG |

TABLE 2-continued

| VAT Commit Transaction $VAT_{i+1}$ Transaction | | |
|---|---|---|
| | | OP_ELSE OP_HASH160 H($sv_{i+1}$) OP_EQUALVERIFY OP_DUP OP_HASH160 <Hash($P_{i+1}$)> OP_EQUALVERIFY OP_CHECKSIG OP_ENDIF |
| Output 1 | Value | ≈0 |
| | Locking Script | OP_RETURN <sales transaction metadata> |

TABLE 3

| VAT Payment Transaction $VAT_{Pay}$ Transaction | | |
|---|---|---|
| nLockTime | | $t_{i+1}$ |
| Number of Inputs | | 1 |
| Input 0 | Value | $rX_{i+1}$ |
| | Unlocking Script | OP_1 OP_0 sig($P_{TA}$) sig($P_{TA}$) |
| Number of Outputs | | 1 |
| | Value | $rX_{i+1}$ |
| | Locking Script | OP_DUP OP_HASH160 <Hash($P_{TA}$)> OP_EQUALVERIFY OP_CHECKSIG |

TABLE 4

| VAT Refund Transaction $VAT_{Ref}$ Transaction | | |
|---|---|---|
| nLockTime | | — |
| Number of Inputs | | 1 |
| Input 0 | Value | $rX_{i+1}$ |
| | Unlocking Script | OP_0 $sv_{i+1}$ $P_{i+1}$ sig($P_{i+1}$) |
| Number of Outputs | | 1 |
| | Value | $rX_{i+1}$ |
| | Locking Script | OP_DUP OP_HASH160 <Hash($P_{i+1}$)> OP_EQUALVERIFY OP_CHECKSIG |

Figure 11:
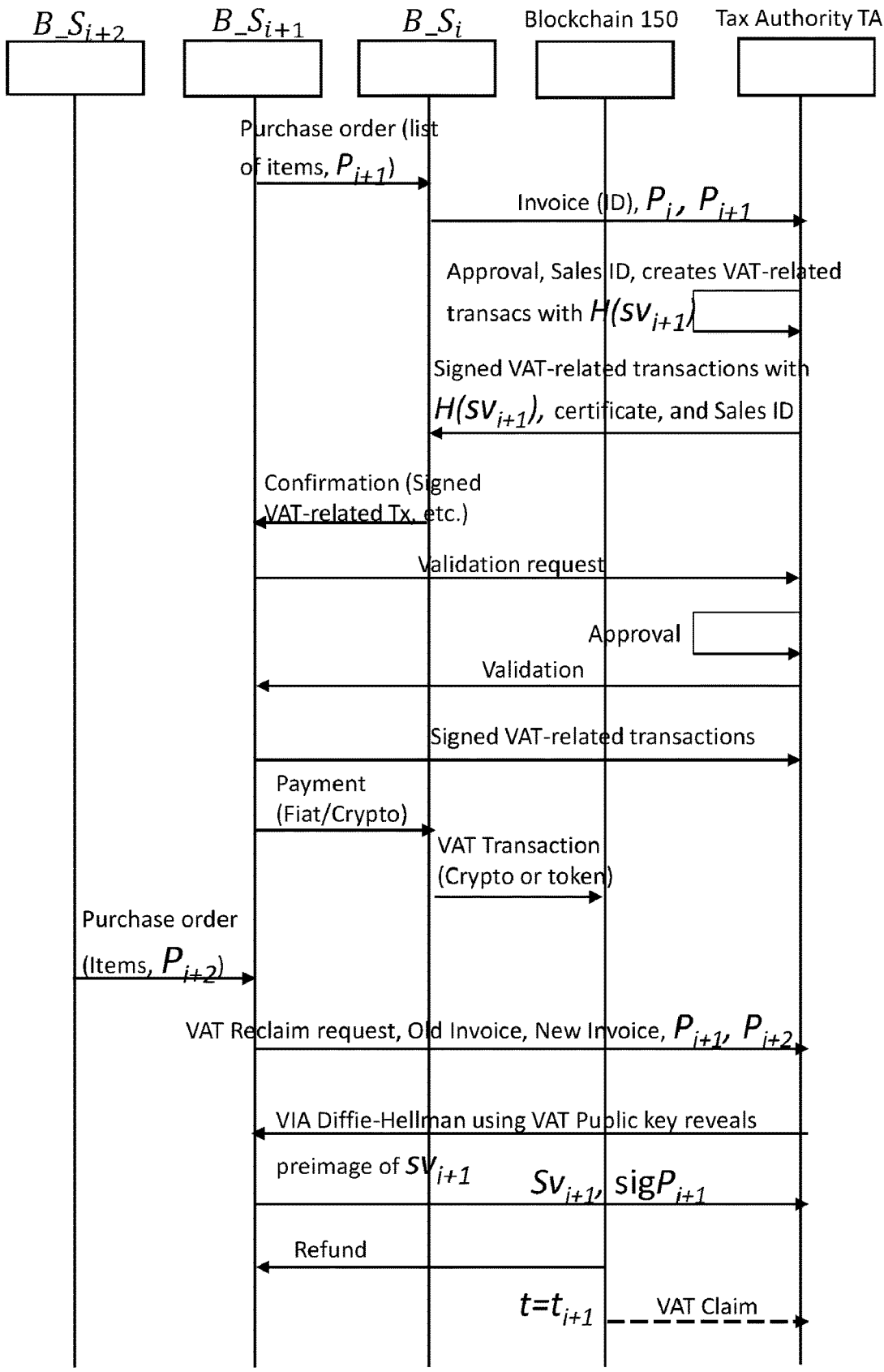
FIG. 11 is a signalling chart showing actions of participants in another example protocol for reclaiming VAT payments, FIG. 12 schematically illustrates another example of sales tax payments between participants in a chain of purchases.

Given the processes involved in the creation of the commitment channel the sequence diagram of FIG. 6 may be revised to include these processes and communications (see FIG. 11). Note that the creation of the VAT transactions ($VAT_{i+1}$ and $VAT_{pay}$) by the TA are included, as well as their communication to $B\_S_{i+1}$ via $B\_S_i$.

Sales Tax System—STAXRT

The STAXRT is the version of the blockchain-based system that is designed to facilitate the management of Sales Tax collection and payment. While in some definitions VAT is often defined as being a subset of Sales Tax, for our purposes we distinguish the two and define the key distinguishing factor between both is that, for Sales Tax, tax is only paid by the individual who makes the final purchase. In order to avoid paying the tax, each intermediary buyer-seller, $\{B\_S_i: i \in [1, n-1]\}$, must present some validation that they should be exempt from paying the tax. This exemption is a certification granted to the buyer-seller by some recognised authority (Tax Authority, e.g. IRS, HMRC). Importantly, for the STAXRT, the buyer-seller's proving of certification is done on the blockchain. More specifically, in the proposed design, the buyer must pay the sales tax to the seller. The seller then immediately escrows the Sales Tax on the blockchain, retrievable by the buyer if he/she has a retail certificate.

Payments

Figure 12:
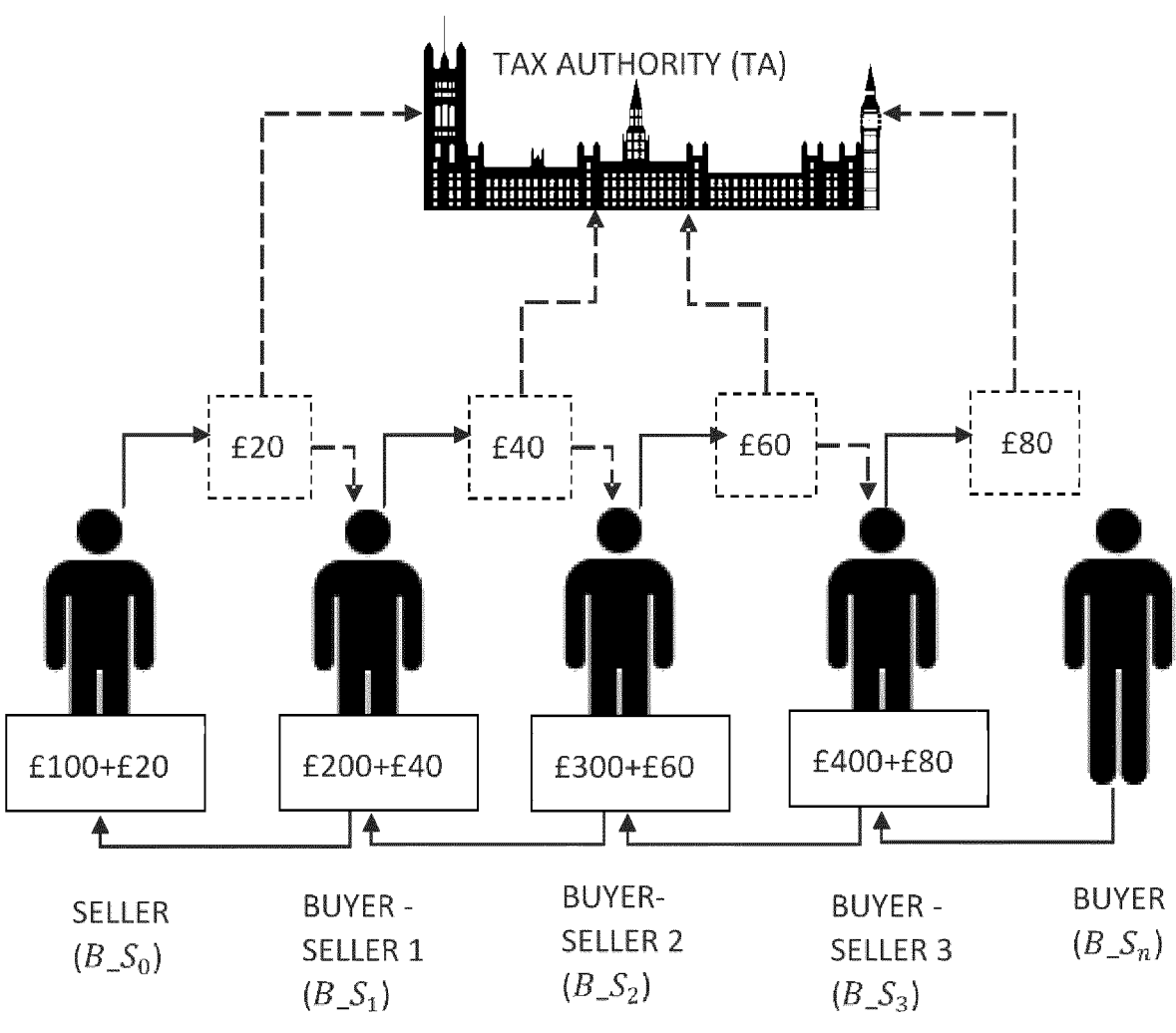

For the STAXRT the design of the system is similarly initially described in terms of the payments between participants, as shown by way of example in FIG. 12.

The left-most figure is the seller (B_S$_0$). As previously mentioned, we assume that this participant only sells goods. The buyer B_S$_1$ purchases the item (Item1) from B_S$_0$ (again there could be more than one item being purchased, but for explanatory purposes, reference here is made to only one 'item' being bought or sold). The Sales Tax Rate is set at 20%. As such if Sale Price is £100, then the B_S$_1$ should pay £20 in VAT to S. This payment could be on block (cryptocurrency) or off block (e.g. FIAT). These Sale Price+Sales Tax payments are shown as the arrows at the bottom of figure.

Note that, similar to VAT, we ask that the buyer-seller on purchase of an Item, that they pay the Sales Tax to the seller regardless. The desire is that the buyer is still able to 'immediately' reclaim their spent Sales Tax, as long as the buyer has the necessary certification. Whilst conventionally a buyer-seller does not pay sales tax at all, by instead paying it and then getting it refunded immediately, the blockchain 150 can be used to record the validity of the buyer-seller's certification.

Consider the initial sales transaction where B_S$_{i+1}$ pays for an item Item$_{i+1}$ from buyer-seller B_S$_i$ for £Y. On being given some form of personal identification by B_S$_{i+1}$, buyer-seller B_S$_i$ then creates a Bitcoin transaction that escrows the Sales Tax in such a way that it can only be claimed by either the Tax Authority or B_S$_{i+1}$. Each of the pair of potential recipients of said transaction has conditions under which he/she is able to claim the VAT. For the Tax Authority, the funds can be claimed only after a specified time t$_1$. This time value represents the deadline given to the buyer B_S$_{i+1}$ to prove their possession of a retail certificate.

The expectation is that at some previous time, the buyer-seller B_S$_{i+1}$ would have applied to the Tax Authority to be granted a 'retail certificate'. This certificate may come in the form of a message signed by the Tax Authority's known and trusted public key. This message would include the Public Key P$_{i+1}$ and other identifying information of the buyer-seller B_S$_{i+1}$ (e.g. KYC, know your client, information). The buyer-seller exclusively knows the private key that corresponds to the public key.

This private key is what would allow B_S$_{i+1}$ to immediately claim any Sales Tax he/she paid. If he/she hasn't spent the escrowed Sales Tax (i.e. proven their ownership of the retail certificate exemption by the time t$_1$ rolls around, then the Tax Authority would simply collect the sales tax for himself.

This series of steps are repeated between each of the participants that follow in the sequence.

Protocol

In order to facilitate this set of payments between the participants, the participants are expected to perform several actions. These actions are captured in the protocol outlined in FIG. 13.

Figure 13:
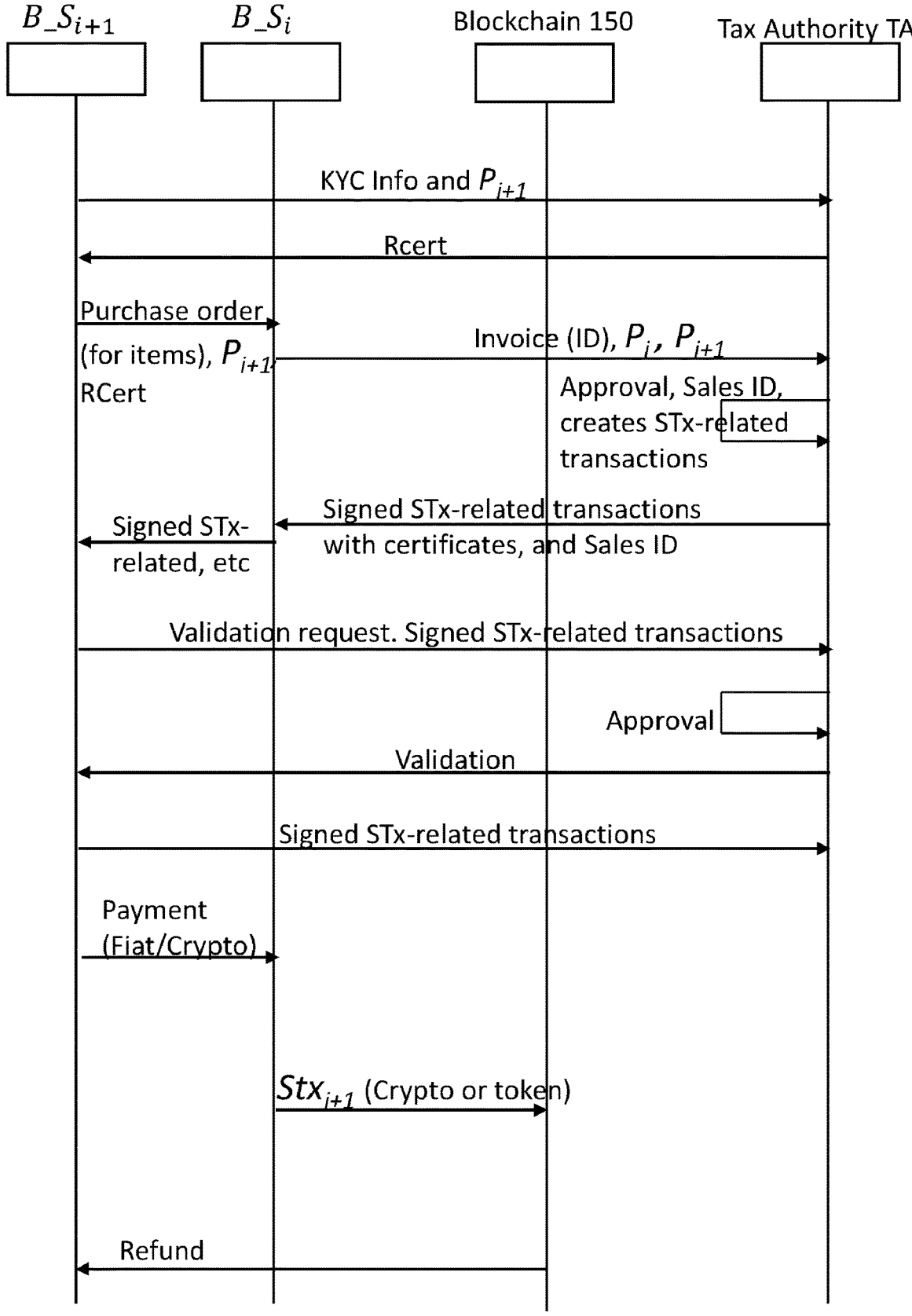
FIG. 13 is a signalling chart showing actions of participants in an example protocol for sales tax payments.

In the protocol shown in FIG. 13 each buyer and/or seller B_S$_i$, if they have no intention to sell, will apply to the Tax Authority for a retail certificate (RCert). The certification request is applied for by buyer-seller B_S$_{i+1}$ who is expecting to purchase an item Item$_{i+1}$ from B_S$_{i+1}$. To get this certification B_S$_{i+1}$ sends to the Tax Authority applicable KYC information such as Business Registration No., etc. In addition, B_S$_{i+1}$ also communicates to the Authority his public key P$_{i+1}$.

On receipt of this information, the Tax Authority will do the necessary checks, and if satisfied, will create a digital certificate of the public key. This retail certificate will include the raw KYC and public key information, along with a signed hash of the said information. This certificate is then securely communicated to B_S$_{i+1}$.

When now purchasing the item Item$_{i+1}$ from B_S$_i$, in addition to providing the seller B_S$_i$ with the purchase order, the buyer B_S$_{i+1}$ also includes his retail certificate. Using this information, the seller B_S$_i$ creates an invoice and sends the invoice to the Tax Authority along with the buyer's retail certificate.

The Tax Authority does its due diligence on the information including assessing the credibility of certificates. Assuming its approval, the Authority creates the Sales Tax Transactions STx$_{i+1}$ (Table 5), STx$_{pay}$ (Table 6), and STx$_{Ref}$ (Table 7). He/she signs the STx$_{i+1}$ and STx$_{pay}$.

The seller B_S$_i$ forwards the signed ST and STx transactions as well as all applicable digital certificates to the buyer B_S$_{i+1}$. Note that 'Sales Tax Transaction (STx)' refers to blockchain transactions utilised in the process of managing Sales Tax, whereas the term 'Sales Transaction (ST) refers to the details of the purchasing of a good, e.g. invoice details etc. (the sales transaction ST is not a blockchain transaction whereas the sales tax transaction is). The buyer B_S$_{i+1}$ may then validate the certificates with the Tax Authority if he desires. On receiving the validation, the buyer B_S$_{i+1}$ signs the STx$_{i+1}$, STx$_{pay}$ transactions and proceeds to pay to the seller B_S$_i$, the Sales Tax required for the item.

On payment of the Sales Tax (in crypto or otherwise) to the B_S$_i$, the seller B_S$_i$ then submits the Bitcoin transaction STx$_{i+1}$ to the blockchain. As the VATx$_{i+1}$, the Bitcoin transaction STx$_{i+1}$ serves as an escrow of the Sales Tax. The transaction enforces the following criteria.

The Tax Authority can access the output of STx$_{i+1}$ after a specified point in time.

The buyer-seller B_S$_{i+1}$ can access the output of STx$_{i+1}$ if he has knowledge of the private key for the retail certificate's public key $$P^{RC}_{i+1}.$$

This is enforced through the customised output script in STx$_{i+1}$ as well as a protocol governing the signing of the spending transactions (see below).

After STx$_{i+1}$ is submitted to the blockchain the buyer-seller B_S$_{i+1}$ is then able to spend the output of Sales Tax Transaction (STx$_{i+1}$) using the signature generated using the private key corresponding to public key P$_{i+1}$.

If buyer-seller B_S$_{i+1}$ does not claim the output of STx$_{i+1}$ before a time t$_{i+1}$ then the Tax Authority can spend the output (essentially the Government at this point claims the Sales Tax as the buyer-seller has been unable to prove that they are a certified reseller).

Sales Tax Transactions

The Sales Tax Transaction STx$_{i+1}$, as previously described, is a transaction that temporarily escrows the Sales Tax until the buyer-seller is able to prove that they possess the private key for public key P$_{i+1}$ (show ownership of retail certificate). A visual representation of the STx$_{i+1}$ is shown in Table 5. Once again, the inputs and the outputs are shown along with the associated contributors and (potential) recipients. The seller B_S$_i$, provides the funds for the input; the Tax Authority provides their signature as approval (via contributing an input with a nominal/minimal fee); whereas the Sales Tax output can be received by either the Tax Authority or the buyer B_S$_{i+1}$.

Figure 14:
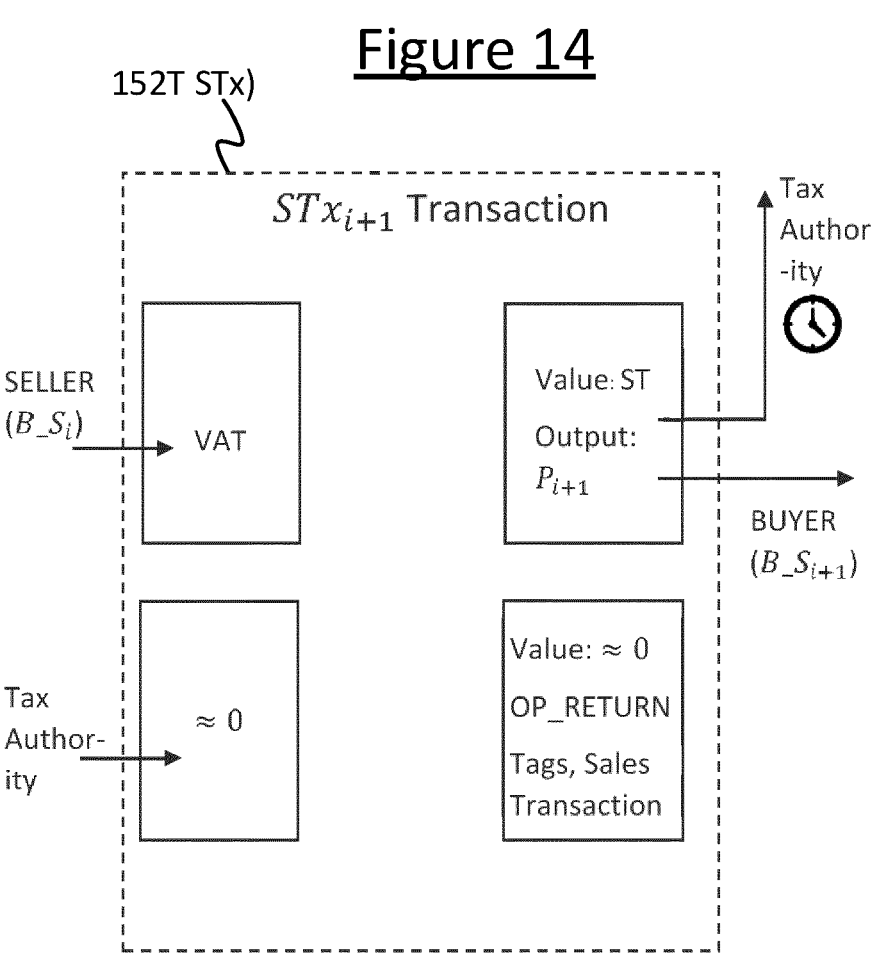
FIG. 14 is a schematic visual representation of a sales tax transaction showing inputs and outputs, FIG. 15 schematically illustrates a commitment channel for the escrow of sales tax, and FIG. 16 schematically illustrates communications between parties.

FIG. 14 illustrates a Sales Tax transaction showing inputs and outputs. The OP_RETURN output is included as a secondary output for the storing metadata related to the sales transaction. This meta data may be encrypted for the purposes of privacy if desired. Unless specified otherwise, referral to the 'output' of the Sales Tax Transaction is referring to the Sales Tax output of the transaction, not the OP_RETURN output.

Figure 15:
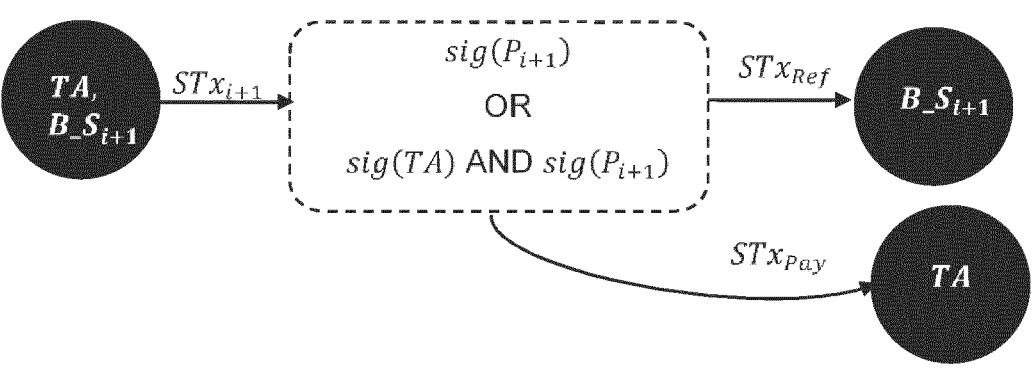

The success of the required escrow properties of the Sales Tax Transaction may be achieved through the use of a commitment channel as described below and shown in FIG. 15.

The commitment channel is made up of three transactions.

$STx_{i+1}$: This is the transaction that commits the Sales Tax to the escrow.

$STx_{pay}$: This is the spending transaction that pays the Sales Tax to the Tax Authority.

$STx_{Ref}$: This is the spending transaction that refunds the Sales Tax to the buyer-seller $B\_S_{i+1}$.

The generation of the channel operates the same as the commitment channel for the VAT escrow—with the notable difference being the 'refund option of the locking script' of the Sales Tax Transaction $STx_{i+1}$ does not require knowledge of sv the secret value (This the secret value that is communicated to $B\_S_{i+1}$ by the Tax Authority). The buyer-seller spender of the output $B\_S_{i+1}$ only is required to produce a signature for the certified public key $P_{i+1}$. Details of the three transactions are shown below in Table 5, Table 6 and Table 7 below.

TABLE 5

| Sales Tax Commit Transaction $STx_{i+1}$ Transaction | |
| --- | --- |
| nLockTime | — |
| Number of Inputs | 2 |
| Input 0      Value | $rX_{i+1}$ |
| Unlocking Script | $P_{i+1}$ sig($P_{i+1}$) |
| Input 1      Value | ≈0 |
| Unlocking Script | $P_{TA}$ Sig($P_{TA}$) |
| Number of Outputs | 2 |
| Output 0     Value | $rX_{i+1}$ |
| Locking Script | OP_IF |
| | OP_2 $P_{i+1}$ $P_{TA}$ OP_2 OP_CHECKMULTSIG |
| | OP_ELSE |
| | OP_DUP OP_HASH160 <Hash($P_{i+1}$)> |
| | OP_EQUALVERIFY OP_CHECKSIG OP_ENDIF |
| Value | ≈0 |
| Locking Script | OP_RETURN <sales transaction metadata> |

TABLE 6

| Sales Tax Payment Transaction $STx_{Pay}$ Transaction | |
| --- | --- |
| nLockTime | $t_{i+1}$ |
| Number of Inputs | 1 |
| Input 0      Value | $rX_{i+1}$ |
| Unlocking Script | OP_1 OP_0 sig($P_{TA}$) sig($P_{i+1}$) |
| Number of Outputs | 1 |
| Value | $rX_{i+1}$ |
| Locking Script | OP_DUP OP_HASH160 <Hash($P_{TA}$)> |
| | OP_EQUALVERIFY OP_CHECKSIG |

TABLE 7

| Sales Tax Refund Transaction $STx_{Ref}$ Transaction | |
| --- | --- |
| nLockTime | — |
| Number of Inputs | 1 |
| Input 0      Value | $rX_{i+1}$ |
| Unlocking Script | OP_0 $P_{i+1}$ sig($P_{i+1}$) |
| Number of Outputs | 1 |
| Value | $rX_{i+1}$ |
| Locking Script | OP_DUP OP_HASH160 <Hash($P_{i+1}$)> |
| | OP_EQUALVERIFY OP_CHECKSIG |

Communication Between Participants

Figure 16:
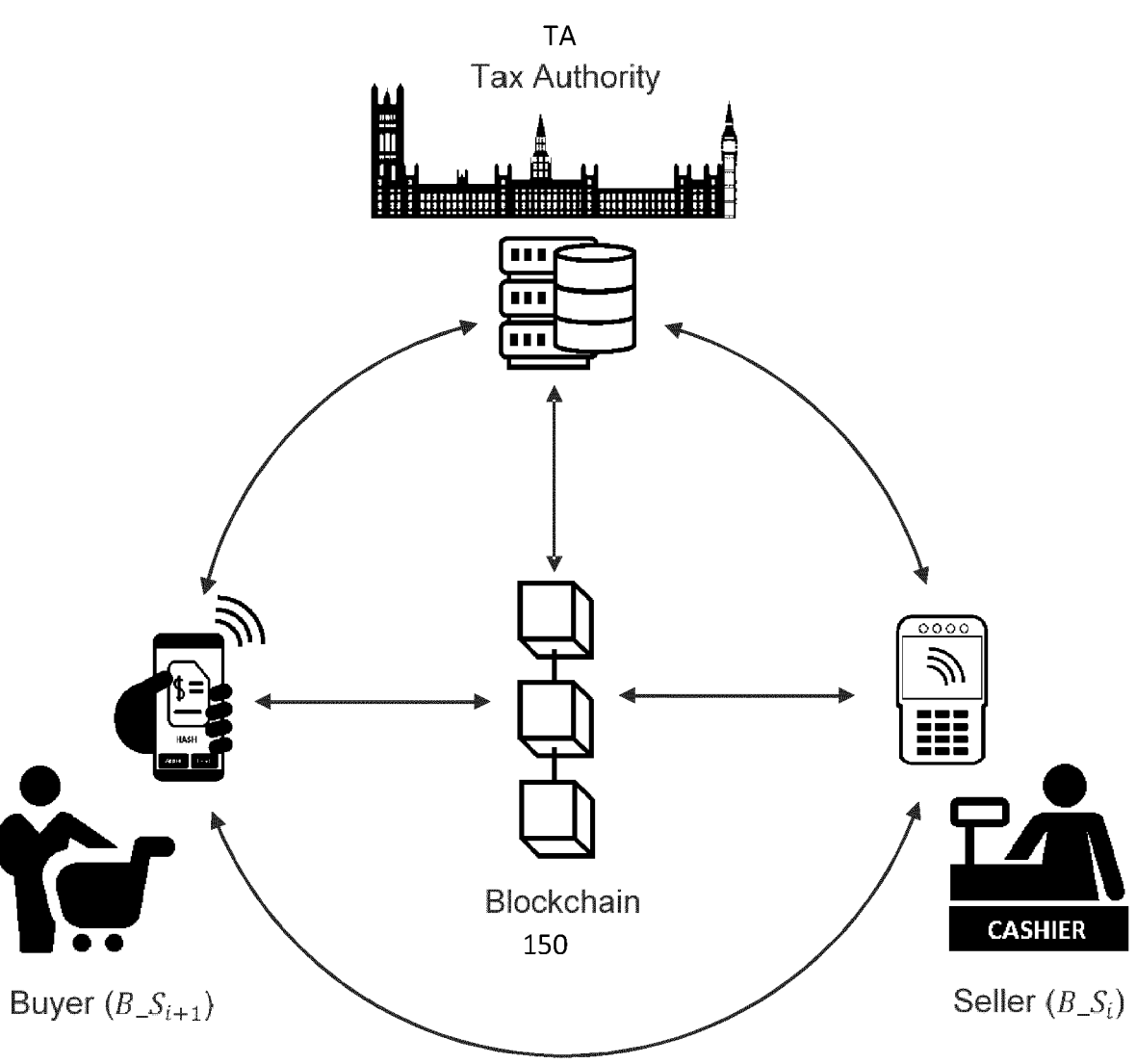

For both the STAXRT and the VTAXRT the participants communicate with each other to exchange the necessary information. FIG. 16 shows an example of the communication channels between participants, where the participants are represented by their respective computing devices.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1: a computer implemented method of facilitating a consumption tax on a purchase of one or more goods and/or services by a buyer from a seller, wherein at least the buyer is a buyer-seller who makes an onward sale based on said goods and/or services; the method comprising, by the seller of said purchase, obtaining a first blockchain transaction that can be redeemed by a second blockchain transaction meeting either of two alternative conditions: a first condition requiring at least that the second blockchain transaction is signed with a cryptographic signature of the buyer, and a second condition requiring at least that the second blockchain transaction is signed with at least a cryptographic signature of a tax authority; and in response to receiving a payment of the consumption tax from the buyer, sending the first blockchain transaction to be recorded on a blockchain.

Statement 2: the method of Statement 1 comprising: receiving a puzzle from the tax authority, wherein a solution to the puzzle comprises a secret shared from the tax authority to the buyer, and wherein the first condition also requires that the second blockchain transaction comprises the solution to the puzzle.

Statement 3: the method of Statement 2, wherein the puzzle comprises a hash puzzle comprising a hash value generated based on a hash of a preimage, the preimage being the solution to the puzzle and comprising said secret.

Statement 4: the method of Statement 2 or 3, wherein the secret comprises a random element.

Statement 5: the method of Statement 2, 3 or 4, wherein the secret changes per purchase and is unique for said purchase.

Statement 6: the method of any of Statements 2 to 5, wherein the secret is based on information of the purchase.

Statement 7: the method of any of Statements 1 to 3, wherein the first condition remains constant over a plurality of purchases by the buyer including said purchase.

Statement 8: the method of any preceding Statement, wherein the second condition also requires that the second transaction comprises a cryptographic signature of the buying party.

Statement 9: the method of any preceding Statement, wherein the second condition further requires a timeout to have elapsed.

Statement 10: the method of Statement 9, wherein the timeout is specified in terms of seconds, minutes, hours, days, weeks, months and/or years.

Statement 11: the method of Statement 9, wherein the timeout is specified in terms of a block height.

Statement 12: the method of any preceding Statement, wherein said obtaining comprises the seller generating the first blockchain transaction at least in part.

Statement 13: the method of Statement 12, wherein the generating is performed by the seller in response to the receipt of the payment of the tax by the selling party.

Statement 14: the method of any of Statements 1 to 11, wherein said obtaining comprises the seller receiving the first blockchain transaction from the tax authority.

Statement 15: the method of any preceding Statement comprising: prior to the obtaining of the transaction, the seller sending information about the purchase to the tax authority, and receiving back a confirmation message from the tax authority based on at least some of this information.

Statement 16: the method of Statement 15, wherein the information about the purchase comprises an indication of the goods and/or services being bought, and/or an amount paid by the seller for the purchase.

Statement 17: the method of Statement 15 or 16, wherein the information about the purchase is based on a purchase order received from the buyer.

Statement 18: the method of Statement 15, 16 or 17, wherein the information about the purchase comprises a digital certificate of the buyer and/or a digital certificate of the seller, enabling the tax authority to authenticate the certificate of the buyer and/or seller before returning said confirmation.

Statement 19: the method of any of Statements 15 to 18, wherein the confirmation message comprises a digital certificate of the tax authority, and/or a sales ID for the purchase.

Statement 20: the method of Statement 19, wherein the confirmation message includes the sales ID and the sales ID is included in the first blockchain transaction.

Statement 21: the method of Statement 19 or 20, wherein the confirmation message includes the certificate of the tax authority, and the method comprises the seller authenticating the certificate of the tax authority, wherein said sending of the first blockchain transaction is conditional on the authentication of the certificate of the tax authority.

Statement 22: the method of any of Statements 15 to 21 as dependent on at least Statements 2 and 12, wherein the confirmation message comprises the puzzle, or template version of the first blockchain transaction, from which the seller generates the first blockchain transaction.

Statement 23: the method of any of Statements 15 to 21, as dependent on at least Statement 14, wherein the confirmation message comprises the first blockchain transaction.

Statement 24: the method of any of Statements 15 to 23, wherein the method comprises: in response to the confirmation from the tax authority, the seller sending back confirmation to the buyer.

Statement 25: the method of Statement 24, wherein the confirmation to the buyer comprises at least some of the confirmation message from the tax authority.

Statement 26: the method of any preceding Statement, wherein the first blockchain transaction further comprises metadata of the purchase.

Statement 27: the method of any preceding claim, wherein the consumption tax comprises a value added tax, VAT.

Statement 28: the method of any of Statements 1 to 26, wherein the consumption tax comprises a sales tax.

Statement 29: the method of any preceding Statement, wherein the blockchain operates according to an output-based model whereby each blockchain transaction comprises at least one output comprising a locking script, and at least one input pointing to an output of another transaction and comprising an unlocking script for unlocking the output of the pointed-to transaction; and wherein the alternative conditions of said first blockchain transaction are included in the locking script of an output of the first blockchain transaction, and an input of said second blockchain transaction points to said output of the first blockchain transaction.

Statement 30: the method of any of Statements 1 to 28, wherein the blockchain operates according to an account-based model whereby each blockchain transaction comprises a smart contract, and wherein the alternative conditions of said first blockchain transaction are defined in the smart contract of the first blockchain transaction.

Statement 31: computer equipment comprising: memory comprising one or more memory units; and processing apparatus comprising one or more processing units, wherein the memory stores code arranged to run on the processing apparatus, the code being configured so as when on the processing apparatus to perform the method of any of Statements 1 to 30.

Statement 32: a computer program embodied on computer-readable storage and configured so as, when run on computer equipment, to perform the method of any of Statements 1 to 30.

Statement 33: a computer implemented method of facilitating a consumption tax on a purchase of one or more goods and/or services by a buyer from a seller, wherein at least the buyer is a buyer-seller who makes an onward sale based on said goods and/or services; the method comprising, by the buyer of said purchase: making the purchase from the seller, including paying the consumption tax to the seller; following said making of the purchase, identifying a first blockchain transaction on the blockchain, wherein the first blockchain transaction is configured to be redeemed by a second blockchain transaction meeting either of two alternative conditions: a first condition requiring at least that the second blockchain transaction is signed with a cryptographic signature of the buyer, and a second condition requiring at least that the second blockchain transaction is signed with at least a cryptographic signature of a tax authority; and sending the second blockchain transaction to be recorded on the blockchain, wherein the second block transaction is configured to meet the first of said alternative conditions, including at least the cryptographic signature of the buyer, and thereby reclaiming the consumption tax for the buyer.

Statement 34: the method of Statement 33 wherein the second blockchain transaction is generated at least in part by the buyer prior to sending.

Statement 35: the method of Statement 34, wherein the first condition also requires that the second blockchain transaction comprises the solution to a puzzle included in the first blockchain transaction, the solution comprising a secret; and wherein the method further comprises, between the making of the purchase and the generating of the second blockchain transaction: the buyer submitting to the tax authority a refund request including a reference to said purchase and information about the onward sale; and the buyer receiving the secret from the tax authority via a secure channel; wherein the generating of the second blockchain transaction by the buyer comprises including in said second transaction the secret as received from the tax authority.

Statement 36: computer equipment comprising: memory comprising one or more memory units; and processing apparatus comprising one or more processing units, wherein the memory stores code arranged to run on the processing apparatus, the code being configured so as when on the processing apparatus to perform the method of any of Statements 33 to 35.

Statement 37: a computer program embodied on computer-readable storage and configured so as, when run on computer equipment, to perform the method of any of Statements 33 to 35.

Statement 38: a computer implemented method of facilitating a consumption tax on a purchase of one or more goods and/or services by a buyer from a seller, wherein at least the buyer is a buyer-seller who makes an onward sale based on said goods and/or services; the method comprising, by a tax authority: receiving information about the purchase from the seller; verifying the purchase based on the received information about the purchase; and in response to said verification, sending back a confirmation message to the seller which enables the seller to obtain, and send for recordal on a blockchain, a first blockchain transaction configured to be redeemed by a second blockchain transaction meeting either of two alternative conditions: a first condition requiring at least that the second blockchain transaction is signed with a cryptographic signature of the buyer, and a second condition requiring at least that the second blockchain transaction is signed with at least a cryptographic signature of a tax authority.

Statement 39: computer equipment comprising: memory comprising one or more memory units; and processing apparatus comprising one or more processing units, wherein the memory stores code arranged to run on the processing apparatus, the code being configured so as when on the processing apparatus to perform the method of Statement 38.

Statement 40: a computer program embodied on computer-readable storage and configured so as, when run on computer equipment, to perform the method of Statement 38.

According to another aspect disclosed herein, there may be provided a method comprising the actions of the seller, buyer and tax authority.

According to another aspect disclosed herein, there may be provided a system comprising the computer equipment of the seller, buyer and tax authority.

The invention claimed is:

1. A computer implemented method of facilitating a consumption tax on a purchase of one or more goods and/or services by a buyer from a seller, wherein at least the buyer is a buyer-seller who makes an onward sale based on said goods and/or services; the method comprising, by the seller of said purchase:

executing a sale of the one or more goods and/or services to the buyer at a point of purchase;

encoding a digital certificate into a request message to a tax authority computer system, the request message including an invoice for the sale of the one or more goods and/or services;

receiving, from the tax authority computer system and in response to the request message, a response message including a payload including a cryptographic hash puzzle generated by the tax authority computer system and a template of a blockchain transaction;

determining a first blockchain transaction that can be redeemed by a second blockchain transaction meeting either of two alternative conditions: a first condition requiring at least that the second blockchain transaction is signed with a cryptographic signature of the buyer, and a second condition requiring at least that the second blockchain transaction is signed with at least a cryptographic signature of a tax authority, by performing the steps of encoding the cryptographic hash puzzle into the first blockchain transaction and encoding data into the template of the blockchain transaction;

in response to receiving a payment of the consumption tax from the buyer, sending the first blockchain transaction to a mining node of a blockchain to cause the first blockchain transaction be recorded on the blockchain and to put into escrow the consumption tax;

receiving, from the tax authority, a notification that the seller is eligible to redeem an output of the first blockchain transaction, wherein the notification includes a solution to the cryptographic hash puzzle; and transmitting a spending transaction to the blockchain to redeem the payment of the consumption tax directly via the blockchain and without receiving a redemption of the consumption tax from the tax authority.

2. The method of claim 1, wherein a solution to the cryptographic hash puzzle comprises a secret shared from the tax authority to the buyer, and wherein the first condition also requires that the second blockchain transaction comprises the solution to the cryptographic hash puzzle.

3. The method of claim 2, wherein the cryptographic hash puzzle comprises a hash puzzle comprising a hash value generated based on a hash of a preimage, the preimage being the solution to the puzzle and comprising said secret.

4. The method of claim 2, wherein the secret comprises a random element.

5. The method of claim 2, wherein the secret changes per purchase and is unique for said purchase.

6. The method of claim 2, wherein the secret is based on information of the purchase.

7. The method of claim 1, wherein the first condition remains constant over a plurality of purchases by the buyer including said purchase.

8. The method of claim 1, wherein the second condition also requires that the second transaction comprises a cryptographic signature of the buyer.

9. The method of claim 1, wherein the second condition further requires a timeout to have elapsed.

10. The method of claim 9, wherein the timeout is specified in terms of seconds, minutes, hours, days, weeks, months and/or years.

11. The method of claim 9, wherein the timeout is specified in terms of a block height.

12. The method of claim 1 comprising:

prior to the determining of the first blockchain transaction, the seller sending information about the purchase to the tax authority, and receiving back a confirmation message from the tax authority based on at least some of this information;

wherein the information about the purchase comprises an indication of the goods and/or services being bought, and/or an amount paid by the seller for the purchase;

wherein the information about the purchase is based on a purchase order received from the buyer; and wherein the information about the purchase comprises a digital certificate of the buyer and/or a digital certificate of the seller, enabling the tax authority to authenticate the certificate of the buyer and/or seller before returning said confirmation.

13. The method of claim 12, wherein the confirmation message comprises a digital certificate of the tax authority, and/or a sales ID for the purchase.

14. The method of claim 13, wherein the confirmation message includes the sales ID and the sales ID is included in the first blockchain transaction.

15. The method of claim 13, wherein the confirmation message includes the certificate of the tax authority, and the method comprises the seller authenticating the certificate of the tax authority, wherein said sending of the first blockchain transaction is conditional on the authentication of the certificate of the tax authority.

16. The method of claim 12, wherein a solution to the cryptographic hash puzzle comprises a secret shared from the tax authority to the buyer, and wherein the first condition also requires that the second blockchain transaction comprises the solution to the cryptographic hash puzzle.

17. The method of claim 12, wherein said obtaining comprises the seller receiving the first blockchain transaction from the tax authority, and wherein the confirmation message comprises the first blockchain transaction.

* * * * *